(12) United States Patent
Nguyen et al.

(10) Patent No.: US 9,831,954 B2
(45) Date of Patent: Nov. 28, 2017

(54) INCREASING DATA BANDWIDTH TO WIRELESS DEVICES

(71) Applicant: Oregon State University, Corvallis, OR (US)

(72) Inventors: Thinh P. Nguyen, Corvallis, OR (US); Alan X. Wang, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 14/857,676

(22) Filed: Sep. 17, 2015

(65) Prior Publication Data

US 2016/0088511 A1 Mar. 24, 2016

Related U.S. Application Data

(60) Provisional application No. 62/052,201, filed on Sep. 18, 2014.

(51) Int. Cl.
*H04B 10/50* (2013.01)
*H04L 5/00* (2006.01)
*H04B 10/112* (2013.01)

(52) U.S. Cl.
CPC ....... *H04B 10/503* (2013.01); *H04B 10/1129* (2013.01); *H04L 5/006* (2013.01); *H04L 5/0055* (2013.01)

(58) Field of Classification Search
CPC ............... H04B 10/502; H04B 10/503; H04B 10/1143; H04B 10/1149
See application file for complete search history.

(56) References Cited

U.S. PATENT DOCUMENTS

| | | | | |
|---|---|---|---|---|
| 2007/0067808 A1* | 3/2007 | DaCosta | ............ | H04N 7/17318 725/62 |
| 2011/0087879 A1* | 4/2011 | Chand | ...................... | H04K 3/25 713/153 |
| 2011/0164878 A1* | 7/2011 | Ma | ..................... | H04B 10/1149 398/79 |
| 2011/0300939 A1* | 12/2011 | Mao | ....................... | G06F 3/0321 463/36 |
| 2014/0068357 A1* | 3/2014 | Georges | ................. | H04L 47/40 714/704 |
| 2014/0180487 A1* | 6/2014 | Bull | ........................ | H04L 12/12 700/295 |

* cited by examiner

*Primary Examiner* — Dzung Tran
(74) *Attorney, Agent, or Firm* — Klarquist Sparkman, LLP

(57) ABSTRACT

Techniques and solutions are provides for increasing data bandwidth to wireless devices in a wireless network. Data bandwidth to a wireless device can be increased by using an array of wireless transmitters of one type, arranged to cover one or more areas of an enclosed space, in combination with one or more wireless transmitters of another type, to simultaneously transmit data to the wireless device over different wireless communication channels.

22 Claims, 15 Drawing Sheets

INCREASING DATA BANDWIDTH TO WIRELESS DEVICES

CROSS REFERENCE TO RELATED APPLICATION

This application claims priority from U.S. Provisional Application No. 62/052,201, filed Sep. 18, 2014, which is incorporated herein by reference in its entirety.

ACKNOWLEDGMENT OF GOVERNMENT SUPPORT

This invention was made with government support under grant CNS-0845476 awarded by the National Science Foundation. The government has certain rights in the invention.

FIELD

This application relates to wireless communication and techniques to increase data bandwidth in a wireless network.

BACKGROUND

As the number of wireless devices continues to grow, the increasing demand on the available data bandwidth of wireless networks is becoming a critical problem. Unlike wired communications where, in theory, more cables can be used to accommodate increased data bandwidth demand, wireless communication spectrums cannot be arbitrarily increased due fundamental physical limitations. Furthermore, additional transmitters cannot be added to the most common types of wireless networks—Wi-Fi and cellular networks—without also introducing signal interference. While techniques such as code division multiple access and time division multiple access can be used to mitigate this interference, these techniques have the effect of reducing the total data bandwidth available to each wireless device on the network. Also, alternative wireless communication technologies, such as free-space optical technologies, are currently limited to short range transmissions or transmissions that require line of sight, both of which limit the mobility of the devices receiving these transmissions.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The technologies described herein can be used to increase data bandwidth to wireless devices. In some embodiments, data bandwidth to a wireless device can be increased by using an array of wireless transmitters of one type, arranged to cover one or more areas of an enclosed space, in combination with one or more wireless transmitters of another type, to simultaneously transmit data to the wireless device over different wireless communication channels.

In some embodiments, the array of two or more wireless transmitters are used to transmit part of a data message to the wireless device over one wireless communication channel, while the other group of one or more transmitters are used to simultaneously transmit another part of the data message to the wireless device over a different wireless communication channel. In some embodiments, an access point is used to control the transmission of data to the wireless device over the two different communication channels. In some embodiments, the access point can detect the location of the wireless device, relative to the transmitters in the array of two or more transmitters, and can use this location information to determine which transmitters in the array to use to transmit data to the wireless device. In some embodiments, a location assisted coding scheme can be used to reduce interference among the transmitters in the array of two or more transmitters without impacting the data rates of the transmitters.

The foregoing and other objects, features, and advantages of the invention will become more apparent from the following detailed description, which proceeds with reference to the accompanying figures.

DETAILED DESCRIPTION

The following description is directed toward techniques and solutions for increasing data bandwidth to wireless devices in a network.

As used herein, the term "data bandwidth" refers to available or consumed information capacity. Data bandwidth is sometimes referred to as "data rate" when it is measured in terms of available or consumed information capacity per unit of time. For instance, data bandwidth is sometimes expressed as multiples of bits per second and, in those cases, it is also referred to as a "bit-rate."

As used herein, the term "communication channel" refers to a pathway or medium that is used to communicate data from one location to another. A communication channel can be a physical transmission medium such as a wire or a wave. Alternatively, when a transmission medium is multiplexed, the communication channel can refer to a logical connection used to communicate data via one or more multiplexed signals. "Wired communication channels" are communication channels where the pathway or medium comprises one or more physical conductors that connect transmitters of data to receivers, such as electrical conductors (e.g. wires and cables), optical conductors (e.g. fiber-optic cables), or the like. Wired communication channels can be advantageous because they can communicate data at high data rates with little interference. "Wireless communication channels" are communication channels that do not require physical conductors connecting transmitters to receivers in order to communicate data, and rely on special purpose transmitters and receivers that are used to transmit the communicated data and receive the communicated data, respectively. Examples of wireless communication channels include communication channels that communicate data via waves travelling through space (such as light waves or radio waves). Wireless communication channels can be advantageous because they can allow many transmitters and receivers to communicate data without being physically connected to one another.

Figure 1:
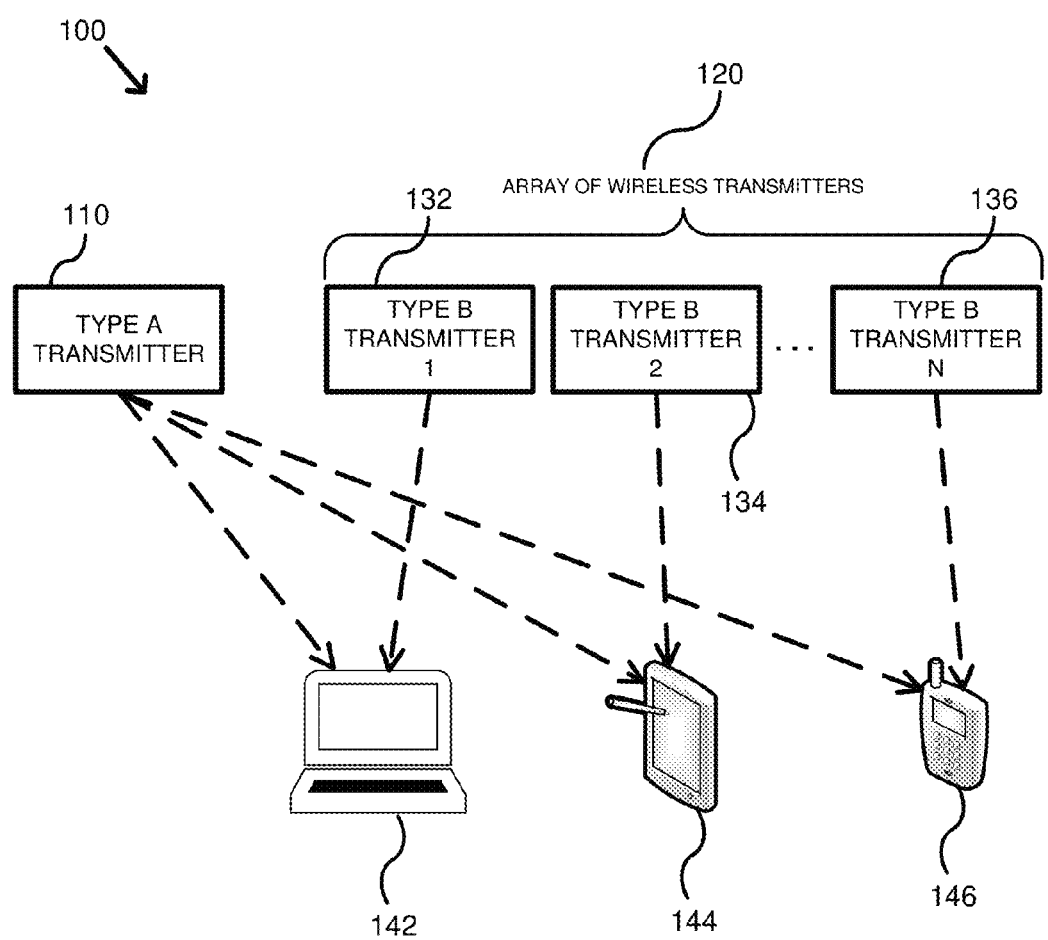
FIG. 1 is a diagram depicting an example system for increasing data bandwidth to wireless devices.

FIG. 1 is a diagram depicting an example system 100 for increasing data bandwidth to wireless devices (e.g. 142, 144, and 146). The example system 100 includes a type A wireless transmitter 110 and an array of type B wireless transmitters 120.

Type A transmitter 110 is configured to transmit data to wireless devices across a first wireless communication channel. For instance, in system 100, transmitter 110 is configured to transmit wirelessly to wireless devices 142, 144, and 146 over the first wireless communication channel. In some embodiments Type A transmitter 110 is a transmitter of a type that does not require line of sight in order to transmit data to wireless devices. In some implementations, transmitter 110 is a radio frequency (RF) type transmitter configured to transmit information by generating radio waves. In a further embodiment, transmitter 110 is configured to transmit information by modulating one or more properties of the generated radio waves. In some embodiments, transmitter 110 is an RF transmitter configured to transmit data using a Wi-Fi protocol. In some embodiments, transmitter 110 is an RF transmitter configured to transmit data using cellular signals. Although one type A transmitter is illustrated in FIG. 1, embodiments comprising a group of more than one type A transmitter communicating with wireless devices via the first communication channel are also possible.

The array of wireless transmitters 120 is comprised of two or more type B transmitters (e.g. 132, 134, and 136) that are configured to transmit data to wireless devices across a second wireless communication channel. In at least one embodiment, the transmitters in array 120, in combination, cover one or more areas of an enclosed space, such as a room. In a further or different embodiment, the transmitters in array 120 communicate with wireless devices in one or more areas of the enclosed space. For instance, in system 100, type B transmitter 1 132 is configured to transmit to wireless device 142, type B transmitter 2 134 is configured to transmit to wireless device 144, and type B transmitter N is configured to transmit to wireless device 146.

In some implementations, the type B transmitters in array 120 require line of sight in order to transmit data to wireless devices. In some implementations, the type B transmitters in array 120 are free-space optical (FSO) type transmitters configured to transmit information by generating diffuse light. For instance, the FSO transmitters may generate invisible light at an eye-safe near-infrared wavelength, such as 850 nm. In at least one implementation, a signal can be transmitted by modulating the light on and off using On-Off Keying (OOK) modulation. In a further or different implementation, the FSO transmitters are configured to generate light at multiple intensities or levels, and a signal can be transmitted by modulating among the multiple levels.

The FSO transmitters may be configured to generate light in diffuse beams. Such an embodiment does not require strict alignment between the FSO transmitters and wireless devices, and has a further advantage of being robust to physical shadowing. In an alternative embodiment, the FSO transmitters are configured to generate one or more cones of diffuse light. Such an embodiment has the advantages of increasing signal strength, while reducing interference among the FSO transmitters by transmitting signals in localized areas.

In some embodiments, at least one of the FSO transmitters transmits a signal using one or more light-emitting diodes (LEDs). LEDs have the advantages of being cheap and ubiquitous. In some other embodiments, at least one of the FSO transmitters transmits a signal using one or more vertical-cavity surface-emitting lasers (VCSELs). VCSELs can transmit signals with greater intensity and at a higher data rate than LEDs, but are more expensive and consume more energy.

In system 100, wireless devices can be configured to receive data from type A transmitter 110 over the first wireless communication channel and to receive data from one or more of the Type B transmitters in array 120 over the second wireless communication channel. For instance, wireless device 142 is configured to receive data from type A transmitter 110 and type B transmitter 1 142. Similarly, wireless device 144 is configured to receive data from type A transmitter 110 and type B transmitter 134, and wireless device 146 is configured to receive data from type A transmitter 110 and type B transmitter 136. In some embodiments, a wireless device can simultaneously receive data from type A transmitter 110 and one or more of the type B transmitters in array 120.

In some embodiments, type A transmitter 110 and one or more type B transmitters in array 120 are configured to transmit data to the same wireless client device simultaneously. Simultaneously can mean that there is some overlap in the transmissions, but not necessarily on every packet. In a further embodiment, type A transmitter 110 and one or more type B transmitters in array 120 are configured to transmit different parts of the same data message or data stream to the same wireless device simultaneously. For instance, in example system 100, type B transmitter 132 may transmit a first part of a data message or data stream to wireless device 142 across the first communication channel, and type A transmitter 110 may simultaneously transmit a second part of the data message or data flow to wireless device 142 across the second wireless communication channel.

Figure 2:
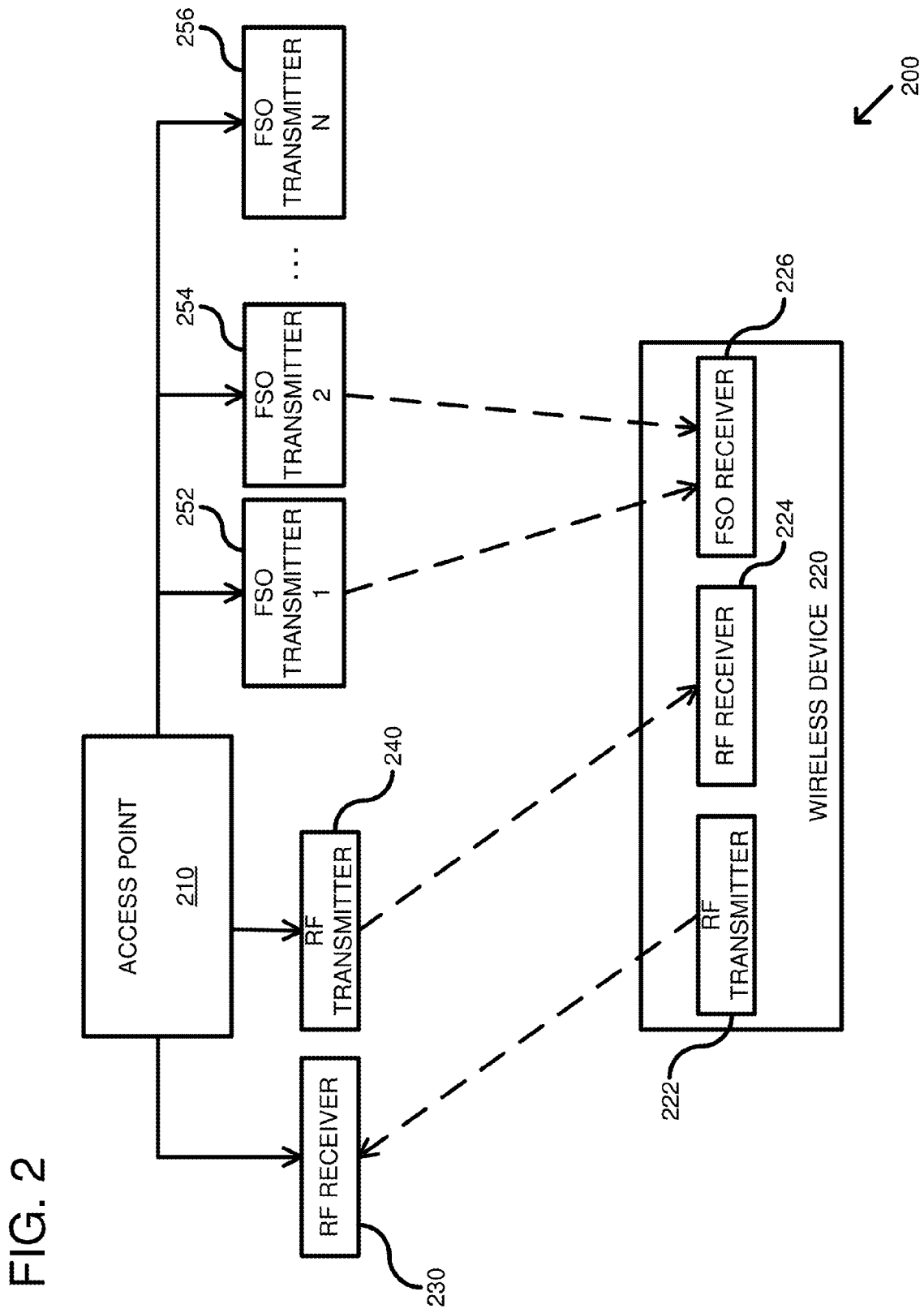
FIG. 2 is a diagram depicting another example system for increasing data bandwidth to wireless devices.

FIG. 2 is a diagram depicting an example system 200 for increasing bandwidth to wireless devices (e.g. 220). The example system 200 includes an access point 210 coupled to an array of two or more FSO transmitters (e.g. 252, 254, and 256), an RF transmitter 240, and an RF receiver 230. In example system 200, access point 210 is coupled to the array of two or more FSO transmitters, RF transmitter 240, and RF receiver 230 by one or more wired connections. In at least one embodiment the wired connections are Ethernet cables. In further or different embodiments, the wired connections comprise hardwired connections. Access point 210 is configured to transmit data to wireless devices via RF transmitter 240 and one or more of FSO transmitters 252, 254, and 256. In at least one embodiment, access point 210 is configured to transmit data to wireless device 220 via RF transmitter 240 using a wireless RF communication channel, and via FSO transmitters 252 and 254 using a wireless diffuse light communication channel. In some embodiments, access point 210 can transmit data via RF transmitter 240 and one or more of the FSO transmitters 252, 254, and 256 simultaneously. In at least one embodiment, the array of two or more FSO transmitters (e.g. 252, 254, and 256) are arranged to communicate with wireless devices in one or more areas of an enclosed space. In a further or different embodiment, RF transmitter 240 is part of a group of one or more RF transmitters configured to communicate with wireless devices in the one or more areas of the enclosed space.

In example system 200, wireless devices can be configured to receive data from access point 210 via RF transmitter 240 and one or more of FSO transmitters 252, 254, and 256. For instance, in FIG. 2, wireless device 220 comprises RF receiver 224 configured to receive signals from the RF transmitter 240, and FSO receiver 226 configured to receive signals from one or more of the FSO transmitters 252, 254, and 256. In some embodiments FSO receiver 226 comprises a photodiode. For instance, an FDS-100 silicon pin photodiode can be used. A FDS-100 silicon pin photodiode has the advantage of having a large active area to receive more optical power for better signal quality.

In example system 200, wireless devices can be further configured to transmit data to access point 210 using the wireless RF communication channel. For instance, in FIG. 2, wireless device 220 comprises RF transmitter 222 configured to transmit data to access point 210 via RF receiver 230.

In at least one embodiment, access point 210 is configured to divide a data message into portions and to selectively transmit some of the portions of the data message to wireless device 220 over RF transmitter 240 and some of the portions of the data message to wireless device 220 over one or more of FSO transmitters 252, 254, and 256. In a further embodiment, access point 210 can transmit portions of the data message over RF transmitter 240, and simultaneously transmit other portions of the data message over one or more of FSO transmitters 252, 254, and 256. For instance, in example system 200, access point 210 can simultaneously transmit a first part of a data message to wireless device 220 via RF transmitter 240, and transmit a second part of the data message to wireless device 220 via one or both of FSO transmitters 252 and 254. Wireless device 220 can receive the first part of the data message via RF receiver 224 and the second part of the data message via FSO receiver 226. In a further embodiment, wireless device 220 is configured to receive the first and second parts of the data message independently and to reassemble them into the original data message. In some embodiments, wireless device 220 is configured to transmit an acknowledgment message to access point 210 over the wireless RF communication channel. In some embodiments, the acknowledgment message includes acknowledging receipt of both the first part of the data message sent via RF transmitter 240 over the wireless RF communication channel and the second part of the data message sent via one or more of FSO transmitters 252 and 254 over the diffuse light communication channel. In a further embodiment, access point 210 receives the acknowledgment message from wireless device 220 via RF receiver 230.

As an example, a data message can be a sequence of bits. Some of the bits in the sequence can be packaged into one or more payloads that are sent to wireless device 220 over RF transmitter 240, and some of the other bits in the sequence can be packaged into one or more other payloads that are simultaneously sent to the wireless device 220 over one or more of FSO transmitters 252, 254, and 256. Wireless device 220 can then receive the first one or more payloads and the second one or more payloads independently, extract the bits from the received payloads, and reassemble the extracted bits into the original sequence of bits. In some embodiments, wireless device 220 can then send an acknowledgment message that is another sequence of bits packaged into one or more payloads to access point 210 over the wireless RF communication channel.

Figure 3:
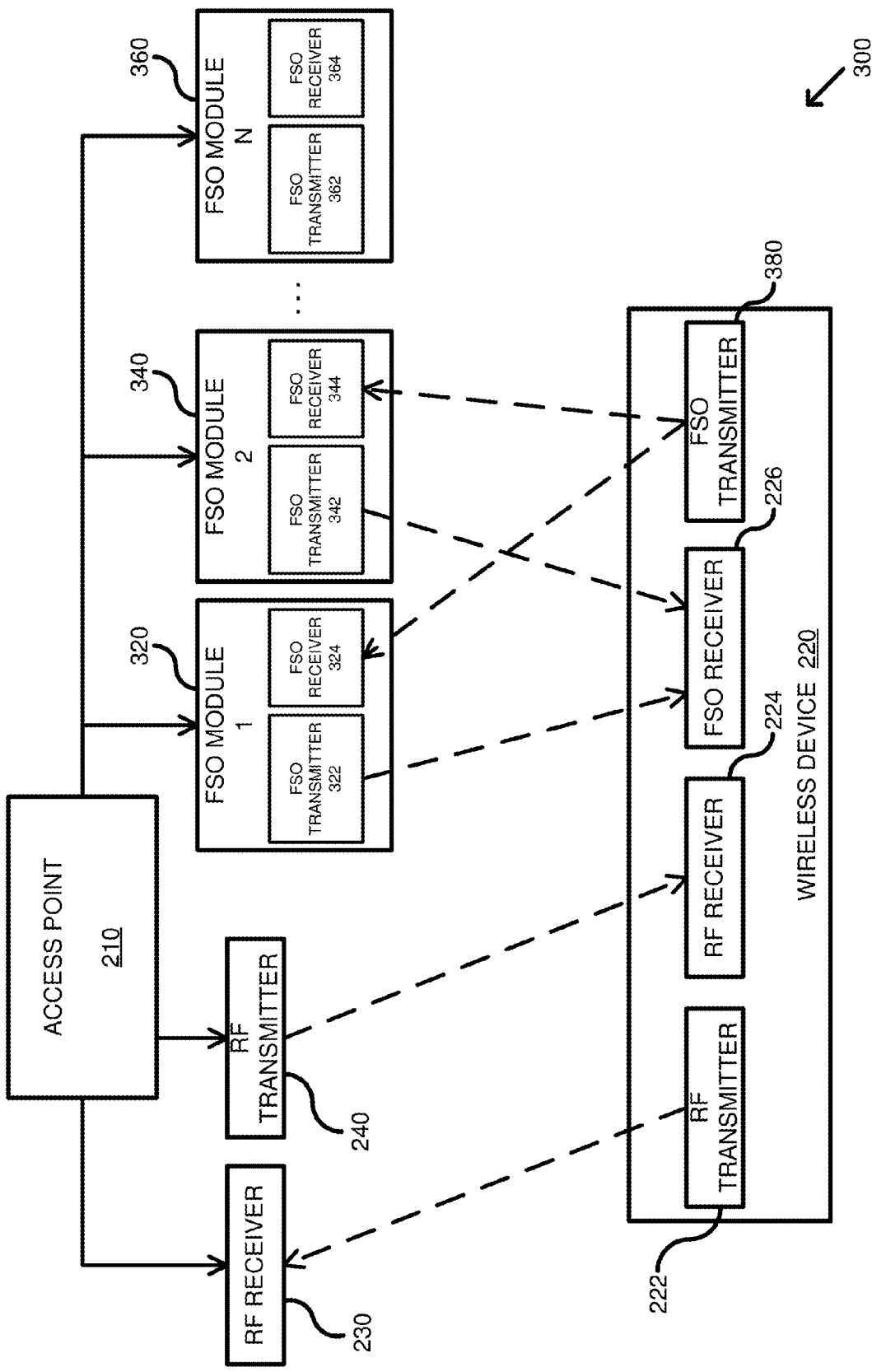
FIG. 3 is a diagram depicting another example system for increasing data bandwidth to wireless devices.

FIG. 3 is a diagram depicting another example system 300 for increasing data bandwidth to wireless devices. The example system 300 includes access point 210 coupled to an array of two or more FSO modules (e.g. 320, 340, and 360), RF transmitter 240, and RF receiver 230. In example system 300, access point 210 is coupled to the array of two or more FSO modules, RF transmitter 240, and RF receiver 230 by one or more wired connections. In some embodiments, the wired connections comprise Ethernet cables. In further or different embodiments, the wired connections comprise hardwired connections. Each FSO module in example system 300 comprises an FSO transmitter configured to transmit data over a wireless diffuse light communication channel (e.g. 322, 342, and 362) and an FSO receiver configured to receive data over the wireless diffuse light communication channel (e.g. 324, 344, and 364). In at least one embodiment, access point 210 is coupled directly to the FSO receivers and the FSO transmitters. Access point 210 is configured to transmit data to wireless devices via RF transmitter 240 using a wireless RF communication channel and via one or more of FSO transmitters 322, 342, and 362 using the wireless diffuse light communication channel.

In at least one embodiment of example system 300, access point 210 is configured to transmit data to wireless device 220 via RF transmitter 240 using a wireless RF communication channel, and via FSO transmitters 322 and 342 using the wireless diffuse light communication channel. In some embodiments, access point 210 can transmit data via RF transmitter 240 and one or more of the FSO transmitters 322, 342, and 362 simultaneously. In at least one embodiment, the array of two or more FSO modules (e.g. 320, 340, and 360) are arranged to communicate with wireless devices in one or more areas of an enclosed space, such as a room. In a further or different embodiment, RF transmitter 240 is part of a group of one or more RF transmitters configured to communicate with wireless devices in the one or more areas of the enclosed space. In a further or different embodiment, the FSO receivers (e.g. 324, 344, and 364) form an array and are arranged to receive signals from wireless devices in the one or more areas of enclosed space.

In example system 300, wireless devices can be configured to receive data from access point 210 via RF transmitter 240 and one or more of FSO transmitters 322, 342, and 362. For instance, in FIG. 3, wireless device 220 comprises RF receiver 224 configured to receive signals from the RF transmitter 240, and FSO receiver 226 configured to receive signals from one or more of the FSO transmitters 322, 342, and 362.

In example system 300, wireless devices can be further configured to transmit data to access point 210 using the wireless RF communication channel and the wireless diffuse light communication channel. For instance, in FIG. 3, wireless device 220 comprises RF transmitter 222 configured to transmit data to access point 210 via RF receiver 230. Wireless device 220 also comprises FSO transmitter 380 configured to transmit data to access point 210 via one or more of the FSO receivers 324, 344, and 364. For instance, in FIG. 3, wireless device 220 is configured to transmit data to FSO receivers 324 and 344.

In at least one embodiment, access point 210 is configured to divide a data message into portions and to selectively transmit some of the portions of the data message to wireless device 220 over RF transmitter 240 and some of the portions of the data message to wireless device 220 over one or more of FSO transmitters 322, 342, and 362. In a further embodiment, access point 210 can transmit portions of the data message over RF transmitter 240, and simultaneously transmit other portions of the data message over one or more of FSO transmitters 322, 342, and 362. For instance, in example system 300, access point 210 can simultaneously transmit a first part of a data message to wireless device 220 via RF transmitter 240, and transmit a second part of the data message to wireless device 220 via one or both of FSO transmitters 322 and 342. Wireless device 220 can receive the first part of the data message via RF receiver 224 and the second part of the data message via FSO receiver 226. In a further embodiment, wireless device 220 is configured to receive the first and second parts of the data message independently and to reassemble them into the original data message. In some embodiments, wireless device 220 is configured to transmit an acknowledgment message to access point 210. In some embodiments, the acknowledgment message includes acknowledging receipt of both the first part of the data message sent via RF transmitter 240 over the radio communication channel and the second part of the data message sent via one or both of FSO transmitters 322 and 342 over the diffuse light communication channel. The acknowledgment message can be sent over the wireless RF communication channel using RF transmitter 222. Alternatively, the acknowledgment message can be sent over the wireless diffuse light communication channel using FSO transmitter 380. In a further or different embodiment, one acknowledgment message can be sent by wireless device 220 using RF transmitter 222 and a second acknowledgment message can be sent by wireless device 220 using FSO transmitter 380.

In at least one embodiment of example system 300, access point 210 receives the acknowledgment message from wireless device 220 sent via the wireless RF communication channel using RF receiver 230. In a further or different embodiment, access point 210 receives the acknowledgment message from wireless device 220 sent via the wireless diffuse light communication channel using one or more of the FSO receivers 324, 344, and 364.

Figure 4:
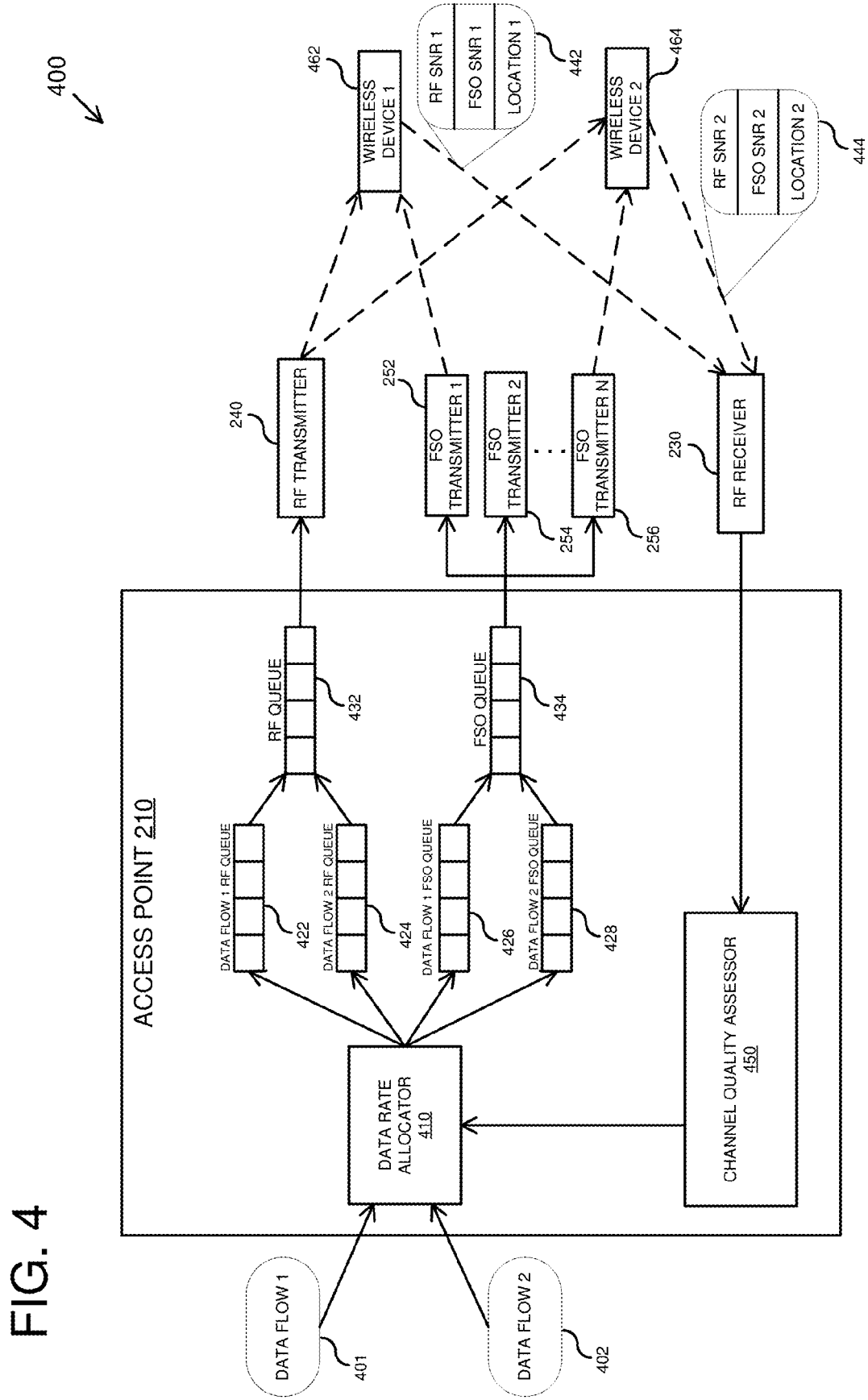
FIG. 4 is a diagram depicting an example system for dynamically adjusting data rates for two wireless channels.

FIG. 4 is a diagram depicting example system 400 for dynamically adjusting data rates for a wireless RF communication channel and a wireless diffuse light communication channel. In example system 400, access point 210 is configured to transmit data via a wireless RF communication channel at a first data rate and to transmit data via a wireless diffuse light communication channel as a second data rate. In some embodiments, access point 210 is configured to transmit data to wireless devices (e.g. 462 and 464) via RF transmitter 240 and one or more of FSO transmitters 252, 254, and 256. For instance, in FIG. 4, access point 210 is configured to transmit data to wireless device 1 462 via RF transmitter 240 using the wireless RF communication channel, and via FSO transmitter 1 252 using the wireless diffuse light communication channel. Access point 210 is also configured to transmit data to wireless device 2 464 via RF transmitter 240 using the wireless RF communication channel, and via FSO transmitter N 256 using the wireless diffuse light communication channel. Access point 210 is also configured to transmit data via RF transmitter 240 and one or more of the FSO transmitters 252, 254, and 256 simultaneously.

In some embodiments, access point 210 is configured to transmit data via RF transmitter 240 and one or more of the FSO transmitters 252, 254, and 256 to the same wireless device simultaneously. In at least one embodiment, access point 210 is configured to divide a data flow into portions and to selectively transmit some of the portions of the data flow to a wireless device over RF transmitter 240 and some of the portions of the data flow to the wireless device over one or more FSO transmitters. In a further embodiment, access point 210 can transmit portions of the data flow over RF transmitter 240 at a first data rate, and transmit other portions of the data flow over one or more of the FSO transmitters at a second, different data rate. For instance, in example system 400, access point 210 can transmit a first part of data flow 1 401 to wireless device 1 462 via RF transmitter 240 at a first data rate, and transmit a second part of data 401 to wireless device 462 via FSO transmitter 252 at a second data rate.

In example system 400, a data flow can be a data message, a data stream, or any other sequence of data items. In some embodiments, a data flow can be sent to access point 210 by an external server over a network, such as an intranet or the Internet. Access point 210 can be configured to transmit more than one data flow at the same time. For instance, in FIG. 4 access point 210 is configured to transmit data flow 1 401 to wireless device 1 462 and to transmit data flow 2 402 to wireless device 2 464.

In example system 400, access point 210 comprises a data rate allocator 410. Data rate allocator 410 is configured to receive a data flow, and to transmit some parts of the data flow to RF transmitter 240 at a first data rate and to transmit other parts of the data flow to one or more of the FSO transmitters at a second data rate. In some embodiments, this is accomplished by the use of queues associated with wireless RF and FSO communication channels. For instance, in FIG. 4, data rate allocator 410 is configured to receive data flow 1 401, and to transmit some parts of data flow 401 to a data flow 1 RF queue 422 and to transmit other parts of data flow 1 401 to a data flow 1 FSO queue 426. The parts of data flow 1 401 sent to data flow 1 RF queue 422 are then funneled into RF queue 432 and then sent to RF transmitter 240 for transmission to wireless device 1 462 over the wireless RF communication channel. At the same time, the other parts of data flow 1 401 that were sent to data flow 1 FSO queue 426 are funneled into FSO queue 434 and then are sent to FSO transmitter 1 252 for transmission to wireless device 1 462 over the wireless diffuse light communication channel.

In example system 400, access point 210 can be configured to use separate queues for multiple data flows. For instance, in FIG. 4, data rate allocator 410 is also configured to transmit some parts of data flow 402 to data flow 2 RF queue 424 and to transmit other parts of data flow 2 402 to data flow 2 FSO queue 428. The parts of data flow 2 402 sent to data flow 2 RF queue 424 are funneled into RF queue 432 and then sent to RF transmitter 240 for transmission to wireless device 2 464 over the wireless RF communication channel. At the same time, the other parts of data flow 2 402 that were sent to data flow 2 FSO queue 428 are funneled into FSO queue 434 and then are sent to FSO transmitter N 256 for transmission to wireless device 2 464 over the wireless diffuse light communication channel.

In some embodiments, the wireless RF communication channel data rate and the wireless FSO communication channel data rate for a data flow are dictated by the relative sizes of the parts of the data flow that are sent by data rate allocator 410 to the data flow's RF and FSO queues, respectively.

In example system 400, access point 210 comprises a channel quality assessor 450 configured to assess the relative quality of the wireless RF communication channel and the wireless FSO communication channel for wireless devices. In some implementations, the channel quality assessor 450 can dynamically change the data rates for a data flow based on one or more determinations of channel quality. For instance, in FIG. 4 channel quality assessor 450 is configured to dynamically change the rate at which parts of data flow 1 401 are sent to RF transmitter 240 and the rate at which other parts of data flow 1 401 are sent to FSO transmitter 252 based on channel quality information for wireless device 462. In some embodiments, some parts of a data flow are always transmitted over both the wireless RF communication channel and the FSO wireless communication channel, regardless of relative channel quality, in order to maintain active connections over both communication channels with wireless devices receiving the data flow.

Channel quality assessor 450 can make determinations of channel quality based on several factors, including backlogs associated with the wireless RF and FSO communication channels, signal-to-noise ratios (SNRs), and the locations of wireless devices relative to the FSO transmitters. In some embodiments, the backlogs associated with the wireless RF and FSO communication channels are backlogs associated with one or more of the queues 422-434. In some embodiments, channel quality assessor 450 is configured to detect backlog information associated with each queue in access point 210. A wireless device in example system 400 can be configured to transmit a FSO channel SNR, a RF channel SNR, and a location of the wireless device to access point 210 for use by channel quality assessor 450 in making channel quality determinations for one or more data flows being transmitted to the wireless device. For instance, in FIG. 4, wireless device 462 is configured to transmit relative channel quality information 442 to channel quality receiver 450 via RF receiver 230. Relative channel quality information 442 comprises a SNR for the wireless RF communication channel relative to wireless device 1 462, a SNR for the wireless FSO communication channel relative to wireless device 462, and information indicating the location of wireless device 1 462 relative to the FSO transmitters 252, 254, and 256. Channel quality assessor 450 can then use the relative channel quality information 442, along with backlog information associated with the wireless RF and FSO wireless communication channels, to determine channel quality for the wireless RF communication channel and the wireless FSO communication channel, relative to wireless device 462. Channel quality assessor 450 can be configured to use this information to dynamically adjust the RF and FSO data rates at which data flow 401 is transmitted to wireless device 462. In some embodiments, channel quality assessor 450 dynamically adjusts the data rates by sending updated rate information to data rate allocator 410, which data rate allocator 410 then uses when allocating parts of data flows to queues.

In some embodiments, access point 210 can also use the location of a wireless device relative to the FSO transmitters to determine which one or more of the FSO transmitters to use to transmit data to the wireless device.

In some embodiments, channel quality assessor 450 can be configured to make different channel quality determinations for different data flows. For instance, in FIG. 4, channel quality assessor 450 can use the relative channel quality information 444, along with backlog information associated the wireless RF and FSO communication channels, to determine channel quality for the wireless RF communication channel and the wireless FSO communication channel, relative to wireless device 464. Channel quality assessor 450 can be configured to use this information to dynamically adjust the RF and FSO data rates at which data flow 402 is transmitted to wireless device 464.

In some embodiments channel quality assessor 450 can be configured to dynamically adjust FSO and RF channel data rates on a per data flow per wireless device basis. In such an embodiment, FSO and RF channel data rates for a dataflow can be set to different values for different wireless devices.

Figure 5A:
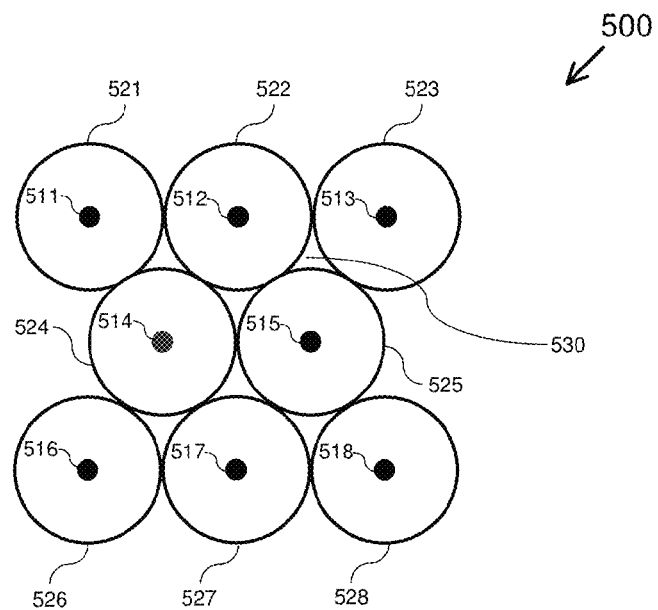
FIG. 5A is a diagram depicting an example transmitter array.

FIG. 5A is a diagram depicting an example FSO transmitter array 500. In example FSO transmitter array 500, FSO transmitters (e.g. 511-518) are arranged to cover multiple areas of a space. For instance, in FIG. 5A, FSO transmitters 511-518 are configured to transmit data in multiple cones of diffuse light with signal coverage areas 521-528. In some instances, the FSO transmitters can be arranged in a triangular lattice.

Figure 5B:
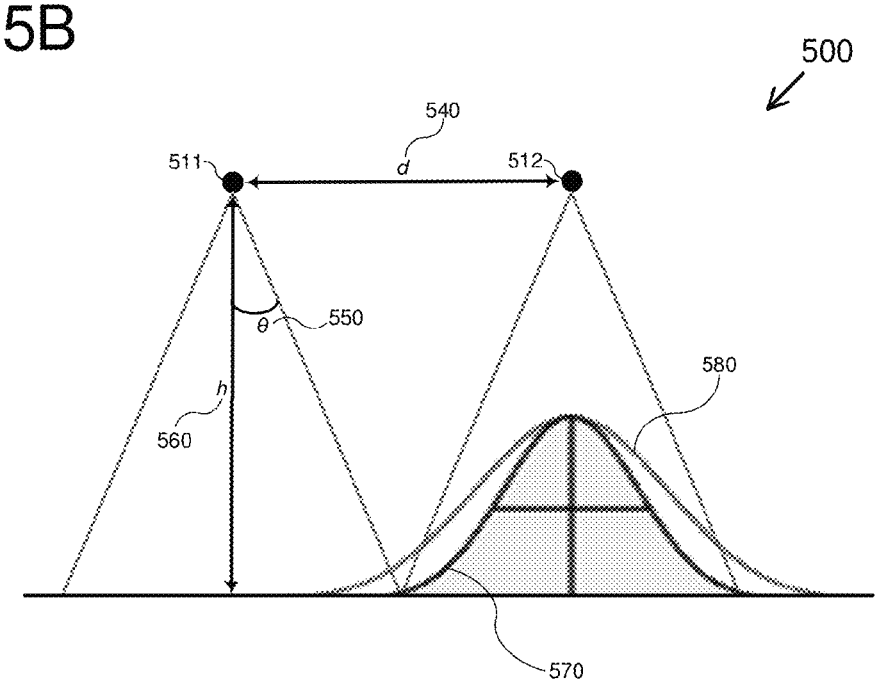
FIG. 5B is a diagram depicting example signal coverage and intensity for transmitters in an example transmitter array.

FIG. 5B is a diagram depicting example signal coverage and signal intensity for the FSO transmitters in example FSO transmitter array 500. FIG. 5B illustrates the relationship between the height of an FSO transmitter (e.g. 511) from a target surface h 560, the divergent angle of the transmitter θ 550, and the minimum distance d 540 between the FSO transmitters (e.g. 511 and 512) such that the signal coverage areas for the FSO transmitters (e.g. 521 and 522) do not overlap. The relationship between d, h, and θ can be represented mathematically by the following equation:

$$d = 2h \tan \theta$$

For instance, in an embodiment where the FSO transmitters in example array 500 are affixed to the ceiling of a room and are projecting downwards, if the height of the room is 5 meters and the divergent angle of each FSO transmitter is 7.5 degrees, then the FSO transmitters must be placed at least 1.36 meters apart in order to avoid coverage area overlap.

FIG. 5B also illustrates the relationship between the signal coverage area for an FSO transmitter (e.g. 512), the signal coverage intensity of the FSO transmitter 570, and the amplitude of the associated electric field 580 in configurations where the light generated by the FSO transmitter is a Gaussian beam. In such configurations, θ is also the divergent angle of the Gaussian beam. A larger θ will increase the signal coverage area and reduce the number of FSO transmitters necessary to cover the entire space, at the cost of decreased signal intensity or increased power consumption.

In FIG. 5A, transmitters 511-518 are arranged in a triangular lattice such that signal coverage areas 521-528 do not overlap. This arrangement has the advantage of minimizing interference from other FSO transmitters for wireless devices in a given FSO transmitter's signal coverage area.

For instance, in FIG. 5A, a wireless device in signal coverage area 521 of FSO transmitter 511 will receive minimal interference from signals transmitted by adjacent FSO transmitters 512 and 514. However, one drawback to this configuration is that gaps are created between the signal coverage areas (e.g. 530). A wireless device located in one of these gaps will not receive a useful signal from any of the FSO transmitters 511-518. Wireless devices in one of the gaps could still receive data over a second wireless communication channel (for instance, over a wireless RF communication channel); however, data rates in the gaps could still be reduced.

Figure 6:
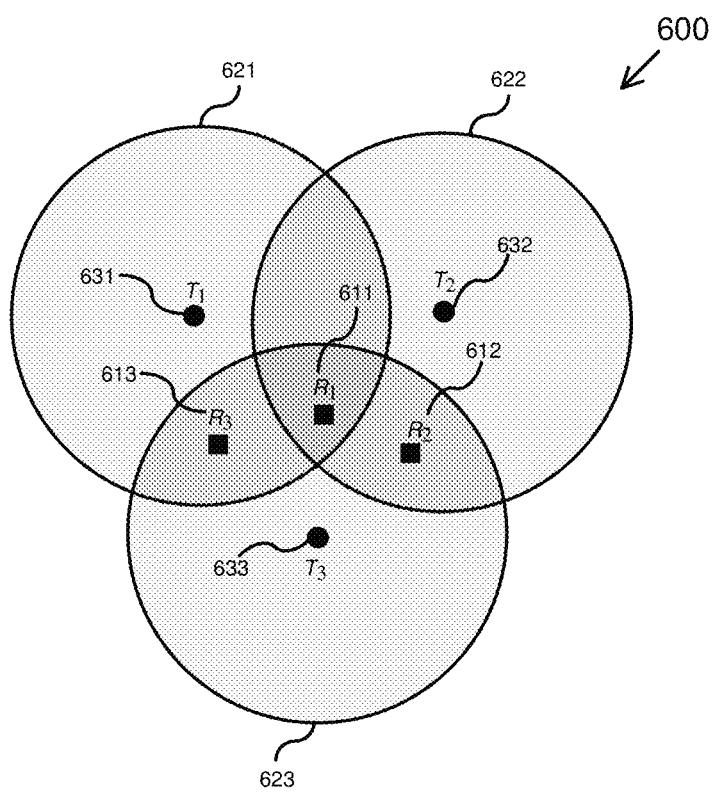
FIG. 6 is a diagram depicting an example transmitter array where the coverage areas for the transmitters overlap.

FIG. 6 is a diagram depicting example transmitter array 600 where signal coverage areas (e.g. 621-623) for at least some of the FSO transmitters (e.g. 631-633) overlap. In such an arrangement, wireless devices (e.g. 611-613) in overlapping coverage areas can receive data from multiple FSO transmitters at the same time. For instance, in FIG. 6, wireless device $R_3$ 613 is located in signal coverage areas 621 and 623 and can receive data from FSO transmitters $T_1$ 631 and $T_3$ 633 at the same time. In scenarios where wireless device $R_3$ wants to receive the data being transmitted by both FSO transmitters $T_1$ and $T_3$, this can be beneficial since wireless device $R_3$ can effectively double the rate at which it receives data from example FSO transmitter array 600. However, in scenarios where wireless device $R_3$ does not want to receive the data being transmitted by both FSO transmitters $T_1$ 621 and $T_3$ 633, the unwanted transmissions constitute interference and can reduce the effective data rate at which wireless device $R_3$ 613 receives data from example FSO array 600.

In FSO transmitter arrays with overlapping coverage areas, one or more of the location assisted coding (LAC) schemes described below can be used to increase throughput and reduce interference for wireless devices.

FIG. 6 illustrates a scenario where three FSO transmitters ($T_1$ 631, $T_2$ 632, and $T_3$ 633) and three receivers (wireless devices $R_1$ 611, $R_2$ 612, and $R_3$ 613) located in different coverage areas. If each receiver is registered to a single FSO transmitter from which it wishes to receive data, then the desired signal will be interfered with by another signal from a different transmitter. For example, suppose $T_3$ transmits "0" to $R_3$. However, if at the same time, $T_1$ transmits "1" to $R_1$, then $R_3$ will receive "1" as interference from $T_1$ instead of the desired "0" from $T_3$.

By using LAC, all of the transmitters can transmit simultaneously without interference. For instance, consider a scenario where there are n transmitters and n receivers. Receiver $R_i$ wants to receive bits $b_i$, where i=1, 2, ..., n, $b_i \in \{0, 1\}$. The goal is for the transmitters $T_1, T_2, ..., T_n$ to transmit bits $t_1; t_2; ..., t_n$ simultaneously, but yet all the receivers $R_i$'s will be able to recover their intended bits $b_i$'s from the received signals $r_i$'s. By assumption, $b_i, t_i \in \{0, 1\}$. On the other hand, $r_i \in \{1, 2, ..., n\}$ since the received signals add constructively. Define H to be the channel matrix whose entry H(i, j) is equal to 1 if receiver i can receive signals from transmitter j and 0 otherwise. For example, the channel matrix associated with the FSO transmitters and receivers illustrated in FIG. 6 is:

$$H = \begin{bmatrix} 1 & 1 & 1 \\ 0 & 1 & 1 \\ 1 & 0 & 1 \end{bmatrix}$$

If the channel matrix H has full rank in a finite field of order 2 (GF(2)), then the LAC coding scheme described below can eliminate interference between the transmitters completely, and allow the transmitters to transmit at their full data rates. Consider the following system of equations in GF(2):

$$\begin{cases} H(1,1)t_1 \oplus H(1,2)t_2 \oplus ... \oplus H(1,n)t_n = b_1 \\ H(2,1)t_1 \oplus H(2,2)t_2 \oplus ... \oplus H(2,n)t_n = b_2 \\ ... \\ H(n,1)t_1 \oplus H(n,2)t_2 \oplus ... \oplus H(n,n)t_n = b_n \end{cases} \quad (1)$$

where $\oplus$ is addition in GF(2), i.e. $a \oplus b = (a+b) \mod 2$. Since the matrix H is a full-rank matrix in GF(2), the system of equations (1) above can be solved for unique $t_1, t_2, ..., t_n$ in terms of $b_1, b_2, ..., b_n$. For example, a Gaussian Elimination method can be used to obtain $t_i$'s. The solution for $t_1, t_2, ..., t_n$ is a linear combination of $b_1, b_2, ..., b_n$. An access point, having access to all the flows of data, transmits $t_1, t_2, ..., t_n$ to the transmitters $T_1, T_2, ..., T_n$, respectively. Each $T_i$ then transmits $t_i$. In some embodiments, channel matrix H is constructed by an access point. In such embodiments, the access point must know which receivers are in which signal coverage areas. In some embodiments, the access point obtains the necessary location information according to one or both of the methods described below with respect to FIGS. 11 and 12. For example, if a receiver is associated with two transmitters then the access point can determine that the receiver is in an overlapped region of those two transmitters' coverage areas. When all receivers are in separate non-overlapped coverage areas, the H matrix is an identity matrix, and therefore full-rank. In those scenarios, $t_i = b_i$.

A receiver $R_i$ needs to be able to recover the bit $b_i$ from the received signal $r_i$. This can be represented as:

$$\begin{cases} r_1 = H(1,1)t_1 \oplus H(1,2)t_2 + ... + H(1,n)t_n \\ r_2 = H(2,1)t_1 \oplus H(2,2)t_2 + ... + H(2,n)t_n \\ ... \\ r_n = H(n,1)t_1 \oplus H(n,2)t_2 + ... + H(n,n)t_n \end{cases} \quad (2)$$

The receiver recovers $b_i$ by performing:

$$r_i \mod 2 = b_i. \quad (3)$$

In this scenario, $b_i = \hat{b}_i$. This can been seen by performing a mod 2 operation on both sides of equations (2), which results in the equations (1). Or simply, if $r_i$ is even then $R_i$ decodes bit $b_i$ as "0", and as "1" otherwise. As a result, each receiver can decode its bits correctly and independently, even in the presence of interference. Furthermore, no other information regarding other wireless devices is required.

LAC Example 1

Consider the overlapped coverage areas as shown in FIG. 6. The channel matrix associated with the FSO transmitters and receivers illustrated in FIG. 6, H, is described above. This matrix is full-rank in GF(2), therefore LAC can be used to transmit data via the FSO transmitters at their full data rates without interference. Specifically, the following system of equations can be solved for $t_1, t_2, t_3$ in GF(2):

$$\begin{cases} t_1 \oplus t_2 \oplus t_3 = b_1 \\ t_2 \oplus t_3 = b_2 \\ t_1 \oplus t_3 = b_3 \end{cases} \quad (4)$$

or $$\begin{cases} t_1 = b_1 \oplus b_2 \\ t_2 = b_2 \oplus b_3 \\ t_3 = b_1 \oplus b_2 \oplus b_3 \end{cases} \quad (5)$$

If the three FSO transmitters ($T_1$ 631, $T_2$ 632, and $T_3$ 633) transmit bits as shown in (5), then the receivers (wireless devices $R_1$ 611, $R_2$ 612, and $R_3$ 613) receive the following signals, respectively:

$$\begin{cases} r_1 = t_1 + t_2 + t_3 \\ r_2 = t_3 + t_3 \\ r_3 = t_1 + t_3 \end{cases} \quad (6)$$

The receivers can then use equation (3) to recover the intended bits. The intended bits, the transmitted signals, the received signals, and the recovered bits for all cases for LAC Example 1 are shown in Table 1:

TABLE 1

| $b_1$ | $b_2$ | $b_3$ | $t_1$ | $t_2$ | $t_3$ | $r_1$ | $r_2$ | $r_3$ | $b_1$ | $b_2$ | $b_3$ |
|---|---|---|---|---|---|---|---|---|---|---|---|
| 0 | 0 | 0 | 0 | 0 | 0 | 0 | 0 | 0 | 0 | 0 | 0 |
| 0 | 0 | 1 | 0 | 1 | 1 | 2 | 2 | 1 | 0 | 0 | 1 |
| 0 | 1 | 0 | 1 | 0 | 1 | 2 | 1 | 2 | 0 | 1 | 0 |
| 0 | 1 | 1 | 1 | 1 | 0 | 2 | 1 | 1 | 0 | 1 | 1 |
| 1 | 0 | 0 | 1 | 1 | 1 | 3 | 2 | 2 | 1 | 0 | 0 |
| 1 | 0 | 1 | 1 | 0 | 0 | 1 | 0 | 1 | 1 | 0 | 1 |
| 1 | 1 | 0 | 0 | 1 | 0 | 1 | 1 | 0 | 1 | 1 | 0 |
| 1 | 1 | 1 | 0 | 0 | 1 | 1 | 1 | 1 | 1 | 1 | 1 |

As can be seen in Table 1, the recovered bits are the same as the intended bits for all cases.

The LAC coding scheme described above uses GF(2), based on the assumption that the FSO transmitters can only transmit "0" and "1" using On-Off Keying (OOK) modulation. In embodiments where transmitters can transmit with q signal levels from "0" to "q−1," where q is a prime number, then the LAC coding scheme can be extended to GF(q) with the following adjustments:

1. At the transmitter, the system of equations (1) is used, except that the addition now is computed over GF(q), i.e. a⊕b=(a+b) mod q. Using Gaussian elimination, a solution for $t_1, t_2, \ldots, t_n$ can be achieved if the matrix H is full-rank in GF(q).
2. At the receiver, the system of equations (2) is used, but now in GF(q). By taking mod q operations on both sides of equations (2), it can be seen that $r_i$ mod q=$b_i$. Therefore, the transmitted bits can be recovered by computing:

$$\hat{b}_i = r_i \bmod q. \quad (7)$$

One advantage of using q multiple signal levels is that it is easier to have a full-rank channel matrix. A matrix that is not full-rank in GF(2) may be full-rank in GF(q) with q>2. Therefore, by letting the transmitters transmit signals with q multiple levels, it may be more likely that the transmitters can transmit at their full data rates. This can be seen in the following example.

LAC Example 2

Consider the following channel matrix:

$$H' = \begin{bmatrix} 1 & 1 & 1 \\ 0 & 1 & 1 \\ 1 & 0 & 1 \end{bmatrix}$$

Figure 7:
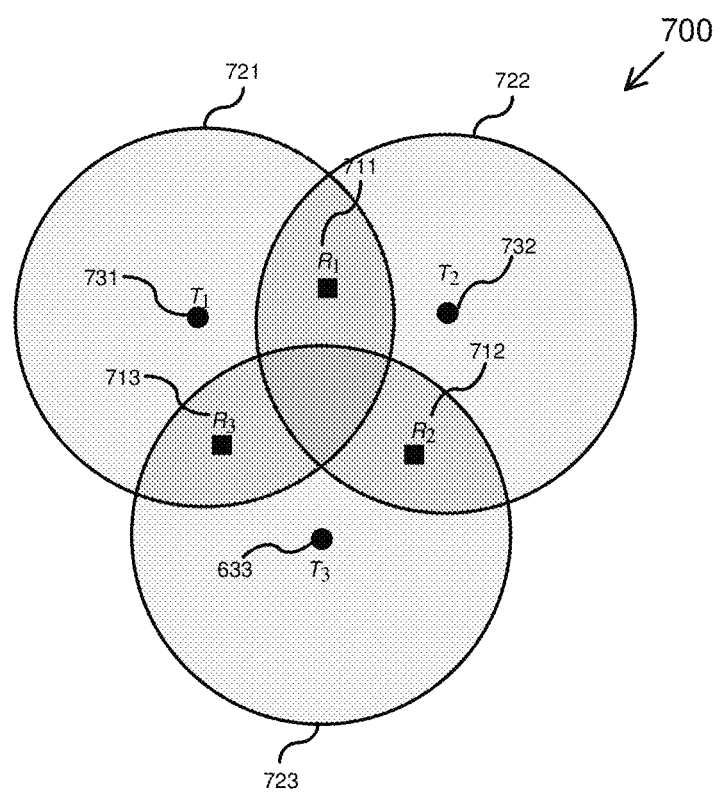
FIG. 7 is another diagram depicting an example transmitter array where the coverage areas for the transmitters overlap.

H' is the channel matrix associated with the transmitters ($T_1$ 731, $T_2$ 732, and $T_3$ 733) and receivers ($R_1$ 711, $R_2$ 712, and $R_3$ 713) illustrated in FIG. 7. H' is not full-rank in GF(2) since rank(H')=2. However, in GF(3), H' is a full-rank matrix. Therefore, if the transmitters can transmit at three signal levels (e.g. 0, 1, or 2) then LAC can be used to eliminate interference between the transmitters and allow the transmitters to transmit at their full data rates.

The intended signals, transmitted signals, received signals, and recovered signals for all cases for LAC Example 2 are shown in Table 2:

TABLE 2

| $b_1$ | $b_2$ | $b_3$ | $t_1$ | $t_2$ | $t_3$ | $r_1$ | $r_2$ | $r_3$ | $b_1$ | $b_2$ | $b_3$ |
|---|---|---|---|---|---|---|---|---|---|---|---|
| 0 | 0 | 0 | 0 | 0 | 0 | 0 | 0 | 0 | 0 | 0 | 0 |
| 0 | 0 | 1 | 2 | 1 | 2 | 3 | 3 | 4 | 0 | 0 | 1 |
| 0 | 0 | 2 | 1 | 2 | 1 | 3 | 3 | 2 | 0 | 0 | 2 |
| 0 | 1 | 0 | 1 | 2 | 2 | 3 | 4 | 3 | 0 | 1 | 0 |
| 0 | 1 | 1 | 0 | 0 | 1 | 0 | 1 | 1 | 0 | 1 | 1 |
| 0 | 1 | 2 | 2 | 1 | 0 | 3 | 1 | 2 | 0 | 1 | 2 |
| 0 | 2 | 0 | 2 | 1 | 1 | 3 | 2 | 3 | 0 | 2 | 0 |
| 0 | 2 | 1 | 1 | 2 | 0 | 3 | 2 | 1 | 0 | 2 | 1 |
| 0 | 2 | 2 | 0 | 2 | 0 | 2 | 2 | 0 | 0 | 2 | 2 |
| 1 | 0 | 0 | 2 | 2 | 1 | 4 | 3 | 3 | 1 | 0 | 0 |
| 1 | 0 | 1 | 1 | 0 | 0 | 1 | 0 | 1 | 1 | 0 | 1 |
| 1 | 0 | 2 | 0 | 1 | 2 | 1 | 3 | 2 | 1 | 0 | 2 |
| 1 | 1 | 0 | 0 | 1 | 0 | 1 | 1 | 0 | 1 | 1 | 0 |
| 1 | 1 | 1 | 2 | 2 | 2 | 4 | 4 | 4 | 1 | 1 | 1 |
| 1 | 1 | 2 | 1 | 0 | 1 | 1 | 1 | 2 | 1 | 1 | 2 |
| 1 | 2 | 0 | 1 | 0 | 2 | 1 | 2 | 3 | 1 | 2 | 0 |
| 1 | 2 | 1 | 0 | 1 | 1 | 2 | 1 | 1 | 1 | 2 | 1 |
| 1 | 2 | 2 | 2 | 2 | 0 | 4 | 2 | 2 | 1 | 2 | 2 |
| 2 | 0 | 0 | 1 | 1 | 2 | 3 | 3 | 3 | 2 | 0 | 0 |
| 2 | 0 | 1 | 0 | 2 | 1 | 2 | 3 | 1 | 2 | 0 | 1 |
| 2 | 0 | 2 | 2 | 0 | 0 | 2 | 0 | 2 | 2 | 0 | 2 |
| 2 | 1 | 0 | 2 | 0 | 1 | 2 | 1 | 3 | 2 | 1 | 0 |
| 2 | 1 | 1 | 1 | 1 | 0 | 2 | 1 | 1 | 2 | 1 | 1 |
| 2 | 1 | 2 | 0 | 2 | 2 | 4 | 4 | 2 | 2 | 1 | 2 |
| 2 | 2 | 0 | 0 | 2 | 0 | 2 | 2 | 0 | 2 | 2 | 0 |
| 2 | 2 | 1 | 2 | 0 | 2 | 4 | 2 | 4 | 2 | 2 | 1 |
| 2 | 2 | 2 | 1 | 1 | 1 | 2 | 2 | 2 | 2 | 2 | 2 |

As can be seen in Table 2, the recovered signals are the same as the intended signals for all cases.

The LAC coding schemes described above are useful scenarios involving n transmitters and n receivers with a full-rank channel matrix. The LAC coding can be extended to a general case where there are n transmitters and m receivers. The channel matrix H is now of size m×n and has rank k (k≤min(m, n)). Therefore, the following k-bit coding algorithm can be used to achieve k bits per time slot. Note that this is also a maximum theoretical rate.

k-Bit Coding Algorithm:

1. Find a set U consisting of k linearly independent rows of H: U={$u_1, u_2, \ldots, u_k$}. Put the remaining m×k rows of H into another set V.
2. From the set of linearly independent rows X=U, create a k×n matrix $\tilde{H}$. $\tilde{H}$ has rank k. Pick k columns from $\tilde{H}$ to create a k×k matrix H' that has rank k.
3. Apply the LAC coding scheme described above for k transmitters and k receivers corresponding to the full-rank matrix H'.

4. Take a row $v_i$ out from V, search through the set U and find a row $u_j \in U$ such that replacing $u_j$ with $v_i$ in the set U results in a set of k linearly independent rows U'.

5. While V is not empty, let X=U' and go to step 2. A round is complete when V is empty.

Figure 8:
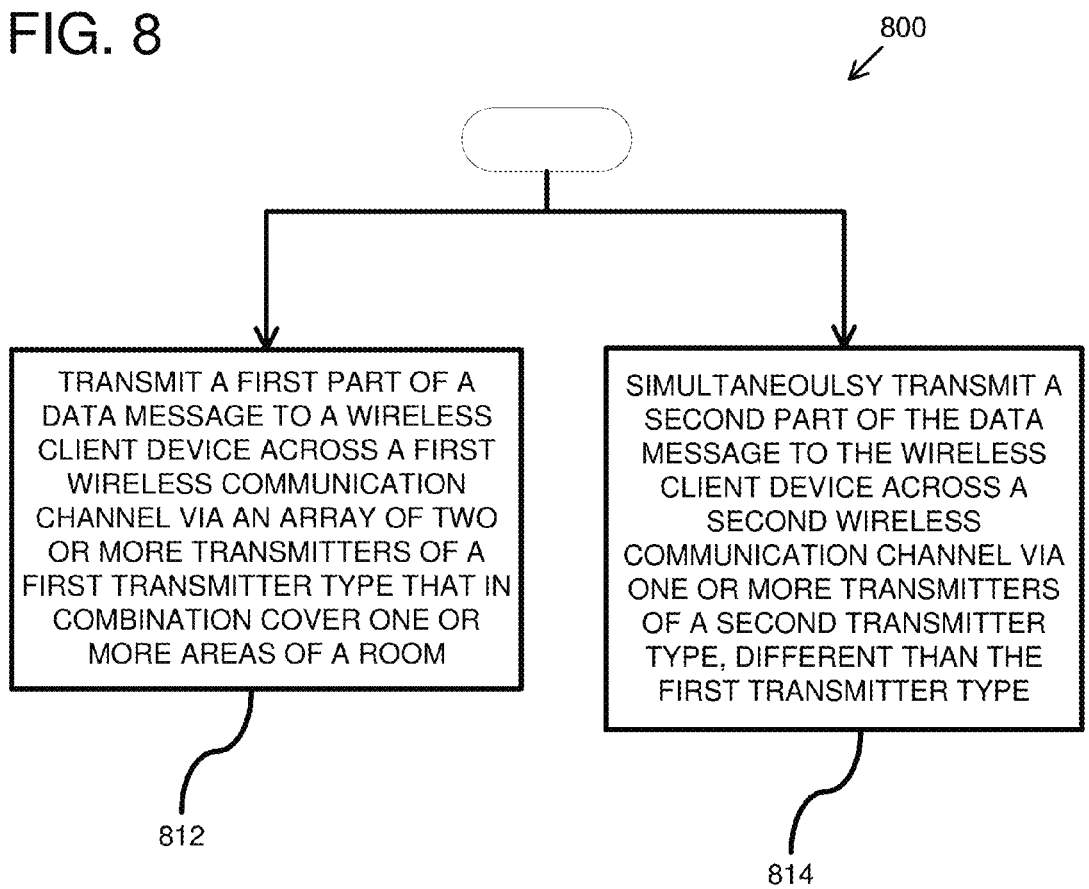
FIG. 8 is a flowchart of an example method for increasing data bandwidth to a wireless device.

FIG. 8 is a flowchart of an example method 800 for increasing data bandwidth to a wireless device. At 812, a first part of a data message is transmitted to a wireless client device across a first wireless communication channel via an array of two or more transmitters of a first transmitter type that, in combination, cover one or more areas of a room. At 814, a second part of the data message is transmitted to the wireless client device across a second communication channel via one or more transmitters of a second transmitter type, different than the first transmitter type.

Figure 9:
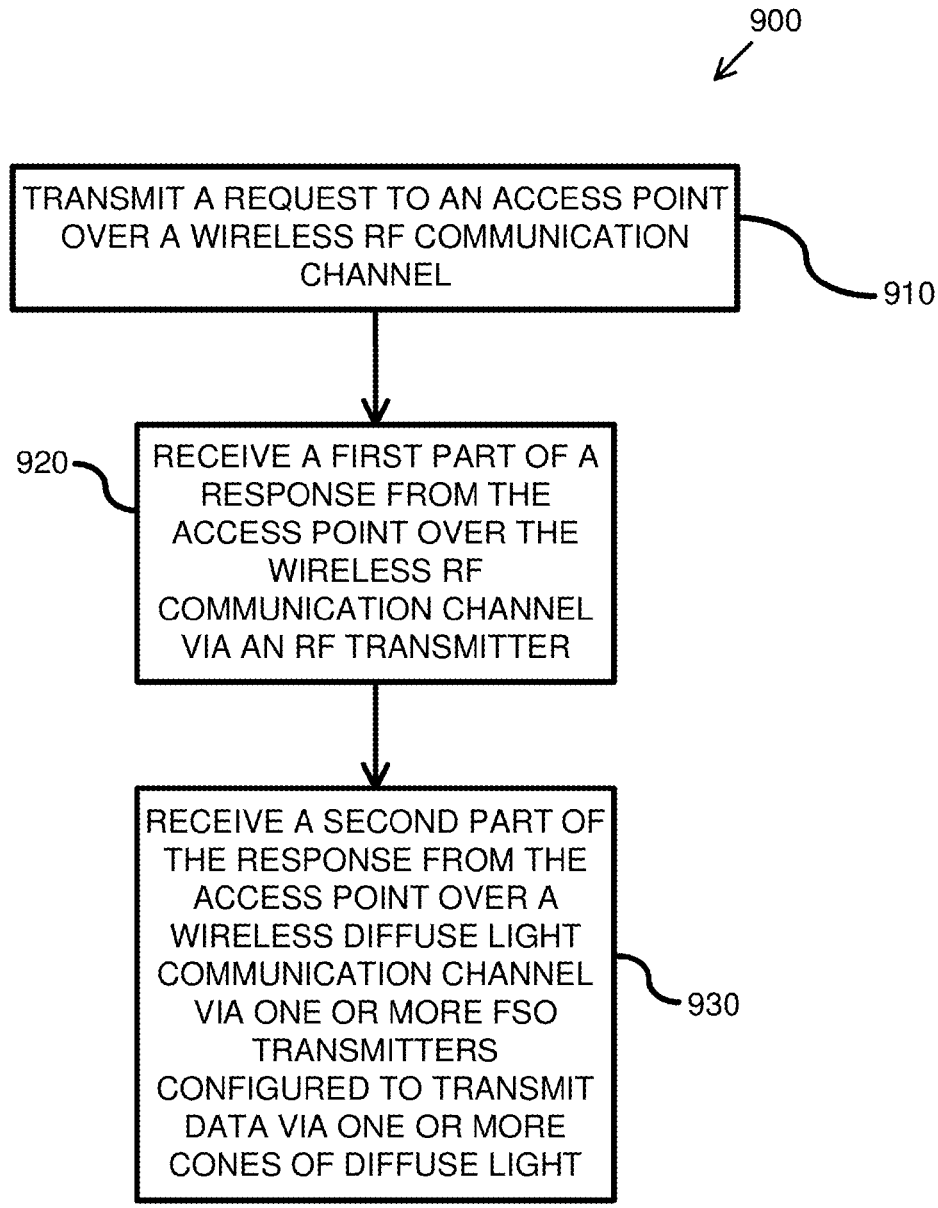
FIG. 9 is a flowchart of another example method for increasing bandwidth to a wireless device.

FIG. 9 is a flowchart of another example method 900 for increasing data bandwidth to a wireless device. At 910, a request is transmitted to an access point over a wireless RF communication channel. At 920, a first part of a response is received from the access point over the wireless RF communication channel via an RF transmitter. At 930, a second part of the response is received from the access point over a wireless diffuse light communication channel via one or more FSO transmitters configured to transmit data via one or more cones of diffuse light.

Figure 10:
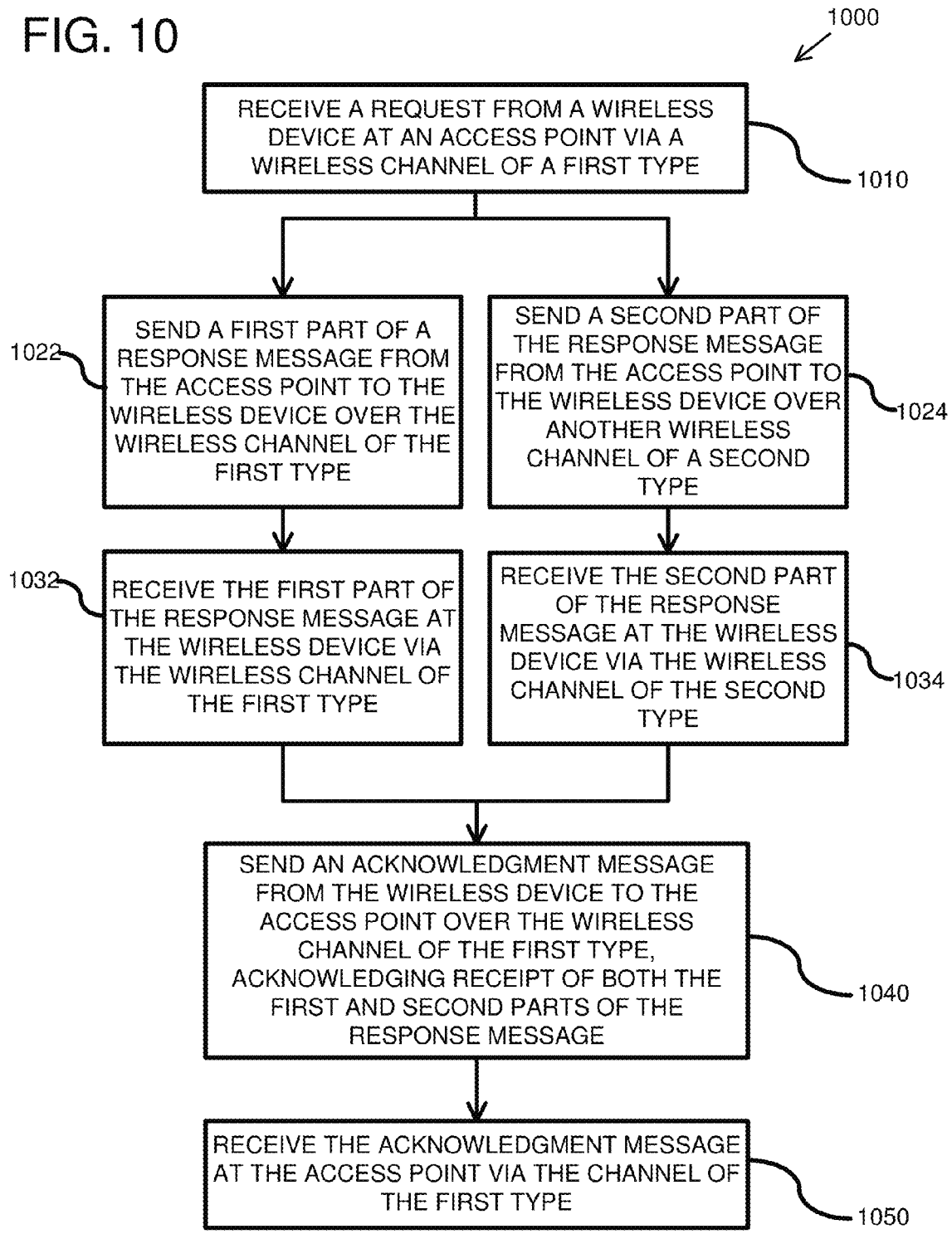
FIG. 10 is a flowchart of another example method for increasing bandwidth to a wireless device.

FIG. 10 is a flowchart of another example method 1000 for increasing bandwidth to a wireless device. At 1010, an access point receives a request from a wireless device via a wireless channel of a first type. At 1022, the access point transmits a first part of a response message to the wireless device over the wireless communication channel of the first type. At 1024, the access point transmits a second part of the response message to the wireless device over another wireless channel of a second type. At 1032, the wireless device receives the first part of the response message via the wireless communication channel of the first type. At 1034, the wireless device receives the second part of the response message via the wireless channel of the second type. At 1040, the wireless device transmits an acknowledgment message to the access point over the wireless channel of the first type, acknowledging receipt of both the first and second parts of the response message. At 1050, the access point receives the acknowledgment message via the wireless channel of the first type.

Figure 11:
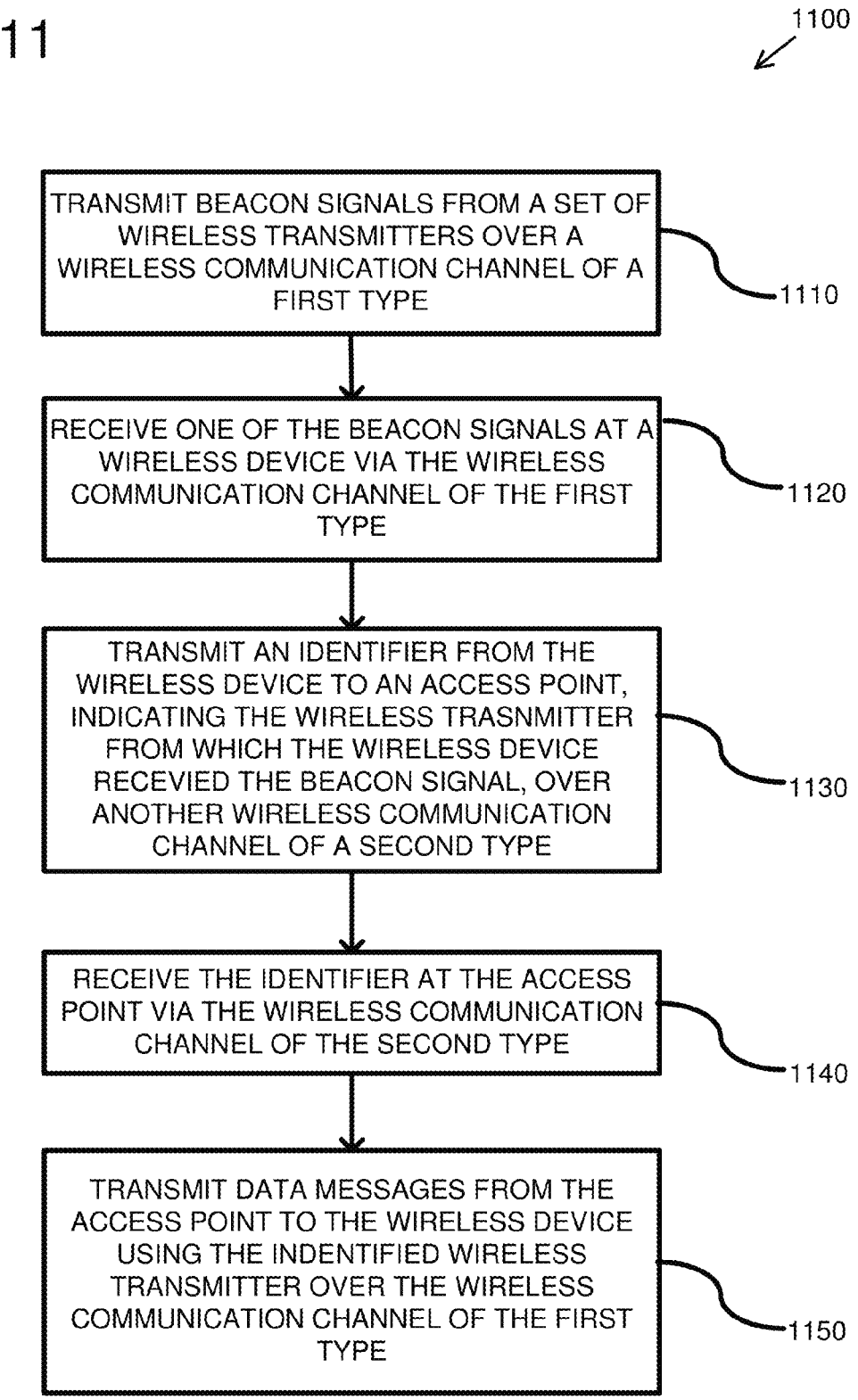
FIG. 11 is a flowchart of an example method for transmitting to a wireless device from one or more wireless transmitters, based on the location of the wireless device relative to the wireless transmitters.

FIG. 11 is a flowchart of an example method 1100 for transmitting to a wireless device from one or more wireless transmitters, based on the location of the wireless device relative to the wireless transmitters.

At 1110, beacon signals are transmitted from a set of wireless transmitters over a wireless communication channel of a first type. In some embodiments, the wireless transmitters are organized in an array. In further or different embodiments, the wireless transmitters are FSO transmitters. In some instances, the FSO transmitters transmit the beacon signals in localized coverage areas, for instance via one or more cones of diffuse light. In at least one implementation, the beacon signals can be transmitted by modulating the light on and off using OOK modulation. In a further or different implementation, the FSO transmitters are configured to generate light at multiple intensities or levels, and the beacon signals can be transmitted by modulating among the multiple levels.

In some embodiments, each transmitter in the set of wireless transmitters generates a beacon signal that differentiates the transmitter from the other transmitters in the set. For instance, a beacon signal may be a number or a globally unique identifier. In embodiments where the set of wireless transmitters are coupled to an access point, the beacon signal may include a transmitter identifier assigned to a transmitter by the access point.

At 1120, a wireless device receives one of the beacon signals via the wireless communication channel of the first type. Receipt of the beacon signal can indicate that the wireless device is located in the signal coverage area of the transmitter that is identified by the beacon signal.

At 1130, the wireless device transmits a location message indicating the wireless transmitter that sent the received beacon signal to an access point over another wireless communication channel of a second type. In embodiments where the beacon signal comprises a transmitter identifier, the location message can comprise the transmitter identifier. In some embodiments, the other wireless communication channel of the second type is a wireless RF communication channel and the wireless device can transmit the location message to the access point via an RF transmitter.

At 1140, the access point receives the location message via the wireless communication channel of the second type. In embodiments where the wireless communication channel of the second type is a wireless RF communication channel, the access point can receive the location message via an RF receiver.

At 1150, the access point transmits messages to the wireless device over the wireless communication channel of the first type using the identified wireless transmitter. In some embodiments, the access point can transmit one or more parts of a data message to the wireless device using the identified wireless transmitter. In a further embodiment, the access point can also transmit one or more other parts of the data message to the wireless device over the other wireless communication channel of the second type.

In some embodiments the wireless transmitters in the set of wireless transmitters can transmit multiple beacon signals. In further or different embodiments, the wireless transmitters can transmit beacon signals at periodic intervals.

In some embodiments, the wireless device may receive beacon signals from more than one wireless transmitter in the set of wireless transmitters. In configurations where the wireless transmitters have overlapping signal coverage areas, this can indicate that the wireless device is in a location where it can receive data from multiple wireless transmitters simultaneously. In such embodiments, the wireless device may transmit a location message to the access point for each transmitter from which it receives a beacon signal. Alternatively, the wireless device may transmit a single location message that identifies more than one transmitter from which it received a beacon signal. Alternatively, the wireless device may determine a preferred wireless transmitter of the transmitters from which it received beacon signals and transmit a location message indicating only the preferred wireless transmitter. In embodiments where the wireless device transmits location messages for multiple transmitters to the access point, the access point may determine a preferred transmitter to use to transmit data messages to the wireless device. Alternatively or additionally, the access point may transmit data messages or parts of data messages to the wireless device using more than one of the identified transmitters.

Figure 12:
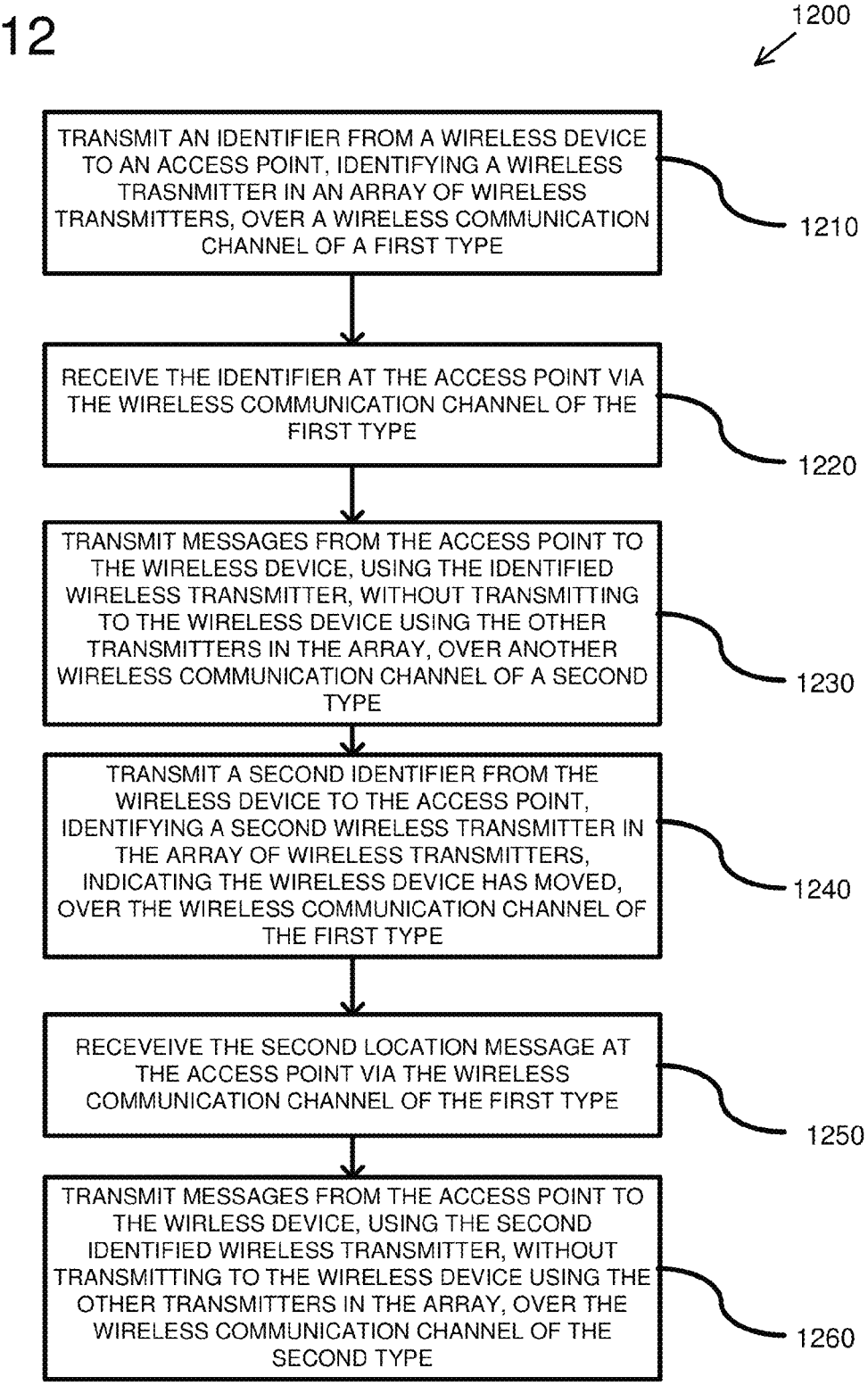
FIG. 12 is a flowchart of an example method for detecting when a wireless device has changed location, relative to an array of wireless transmitters.

FIG. 12 is a flowchart of an example method 1200 for detecting when a wireless device has changed location, relative to an array of wireless transmitters.

At 1210, a wireless device transmits an identifier to an access point, identifying a wireless transmitter in an array of wireless transmitters, over a wireless communication channel of a first type. In some embodiments, the identifier can be the location message described above with respect to FIG. 11. In some embodiments, the wireless communication channel of the first type is a wireless RF communication channel and the wireless device can transmit the identifier to the access point via an RF transmitter At 1220, the access point receives the identifier via the wireless communication channel of the first type. In embodiments where the wireless communication channel of the first type is a wireless RF communication channel, the access point can receive the identifier via an RF receiver.

At 1230, the access point transmits messages to the wireless device using the identified wireless transmitter over another wireless communication channel of a second type. In some embodiments, one or more of the messages transmitted to the wireless device may comprise only a part of a message. In some embodiments, the access point transmits messages to the wireless device using the identified wireless transmitter without transmitting to the wireless device using the other transmitters in the array. In some embodiments, the access point can transmit one or more parts of a data message to the wireless device using the identified wireless transmitter. In a further embodiment, the access point can also transmit one or more other parts of the data message to the wireless device over the wireless communication channel of the first type. In some embodiments, the wireless transmitters are FSO transmitters.

At 1240, the wireless device transmits a second identifier to the access point identifying a second wireless transmitter over the wireless communication channel of the first type. In some embodiments, the second identifier indicates that the wireless device has moved. For instance the second identifier can indicate that the wireless device has moved out of a signal coverage area of the first wireless transmitter and into a signal coverage area of the second wireless transmitter. In other embodiments, the second identifier can indicate that the wireless device wishes to receive future transmissions from the second wireless transmitter instead of the first wireless transmitter.

At 1250, the access point receives the second location message via the wireless communication channel of the first type.

At 1260, the access point transmits messages to the wireless device using the second identified wireless transmitter over the wireless communication channel of the second type. In embodiments where the access point transmitted a part of a message using the first identified wireless transmitter, the access point can use the second identified wireless access point to transmit one or more other parts of the message. In some embodiments, the access point transmits messages to the wireless device using the identified wireless transmitter without transmitting to the wireless device using the other transmitters in the array. In other embodiments, the access point can transmit messages or parts of messages to the wireless device using both the first identified wireless transmitter and the second identified wireless transmitter.

Figure 13:
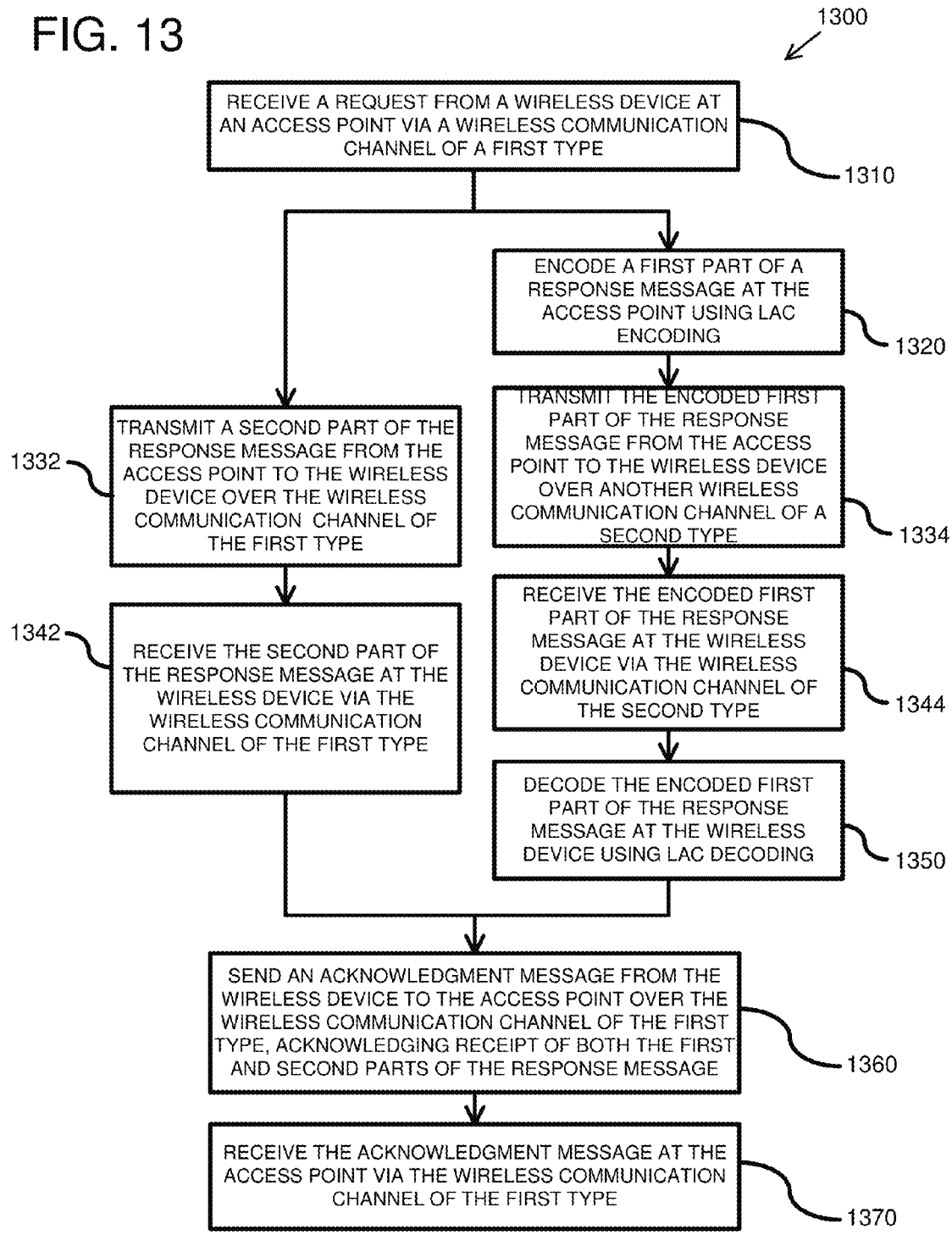
FIG. 13 is a flowchart of an example method for increasing bandwidth to a wireless device that uses location assisted coding.

FIG. 13 is a flowchart of an example method 1300 for increasing bandwidth to a wireless device, that uses location assisted coding (LAC).

At 1310, an access point receives a request from a wireless device via a wireless communication channel of a first type. In some embodiments, the wireless communication channel of the first type is a wireless RF communication channel and the access point can receive the request via an RF receiver.

At 1320, the access point encodes a first part of a response message using LAC encoding. At 1334, the access point transmits the encoded first part of the response message to the wireless device over another wireless communication channel of a second type. In some embodiments, the other wireless communication channel of the second type is a wireless diffuse light communication channel. In such embodiments, the encoded first part of the response can be transmitted to the wireless device via one or more FSO transmitters. In a further embodiment, the FSO transmitters are organized in an array.

At 1344, the wireless device receives the encoded first part of the response message via the wireless communication channel of the second type. At 1350, the wireless device decodes the encoded first part of the response message using LAC decoding.

At 1332, the access point transmits a second part of the response message to the wireless device over the wireless communication channel of the first type. In embodiments where the wireless communication channel of the first type is a wireless RF communication channel, the access point can transmit the second part of the response message via a RF transmitter.

At 1342, the wireless device receives the second part of the response message via the wireless communication channel of the first type. In embodiments where the wireless communication channel of the first type is a wireless RF communication channel, the wireless device can receive the second part of the response message via a RF receiver.

At 1360, the wireless device sends an acknowledgment message to the access point over the wireless communication channel of the first type, acknowledging receipt of both the first and second parts of the response message. At 1370, the access point receives the acknowledgment message via the wireless communication channel of the first type.

Figure 14:
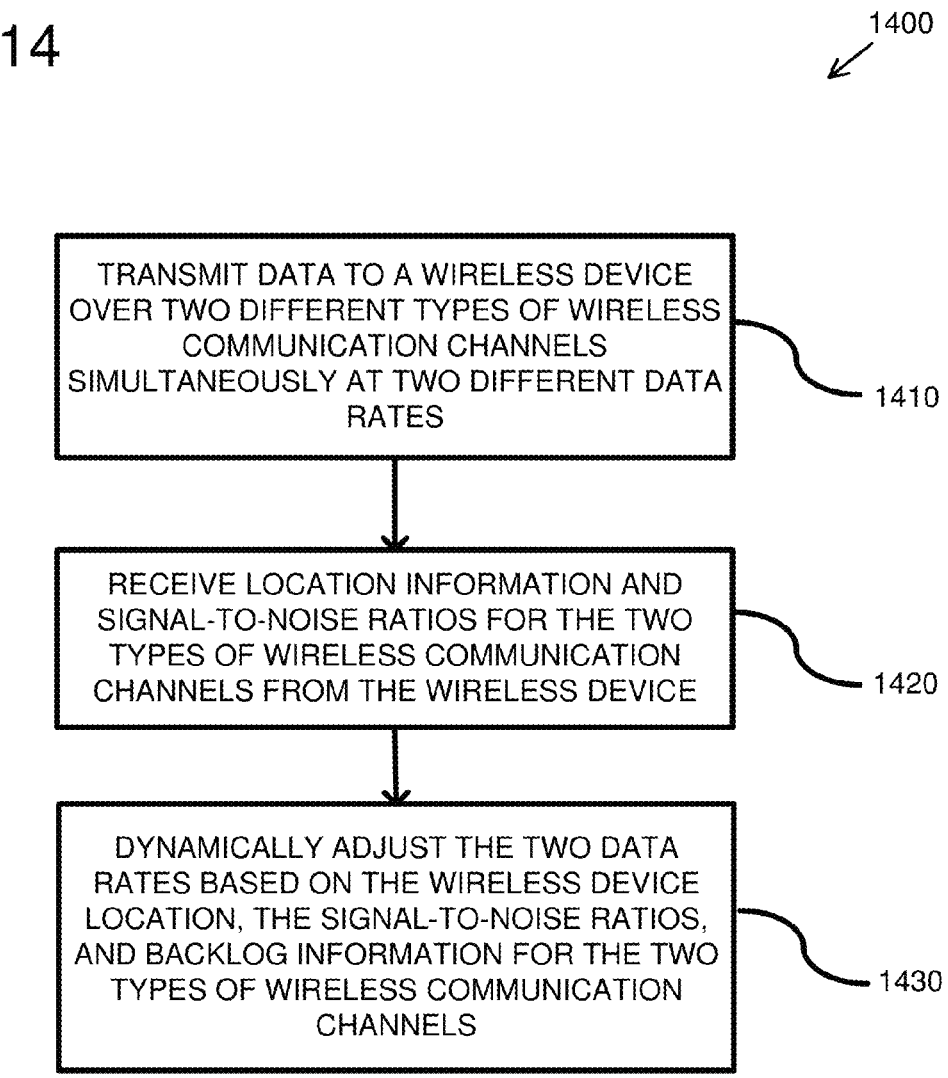
FIG. 14 is a flowchart of an example method for dynamically adjusting data rates for data sent to a wireless device over two types of wireless communication channels.

FIG. 14 is a flowchart of an example method 1400 for dynamically adjusting data rates for data sent to a wireless device over two types of wireless communication channels.

At 1410, data is transmitted to a wireless device over two different types of communication channels simultaneously at two different rates. In some embodiments, the data is transmitted via a wireless RF communication channel at a first data rate and to transmit data via a wireless diffuse light communication channel at a second data rate. In a further embodiment, one part of the data is transmitted via an RF transmitter and another part of the data is simultaneously transmitted one or more of FSO transmitters.

At 1420, location information and signal-to-noise ratios (SNRs) for the two types of wireless communication channels are received from the wireless device. In some embodiments, the location information indicates the wireless device's location relative to one or more transmitters in an array of wireless transmitters configured to transmit data over a communication channel one of the two different types of communication channels. In some embodiments, the wireless device transmits one SNR for each of the two channel types. In further or different embodiments, the wireless device may transmit more than one SNR for one or both of the two channel types. For instance, in an embodiment where more than one transmitter transmits data on a wireless communication channel of one of the two channel types, the wireless device may transmit a SNR for each of the more than one transmitters from which it received data.

At 1430, the two data rates are dynamically adjusted based on the wireless device location, the SNRs, and backlog information for the two types of wireless communication channels. In some embodiments, the backlog information is backlog information associated with one or more data queues associated with the different wireless communication channel types. In some embodiments, the wireless device location, SNRs, and backlog information are used to make a determination of channel quality for each of the two different channel types and the data rates for the two different channel types are dynamically adjusted based on these determinations.

Figure 15:
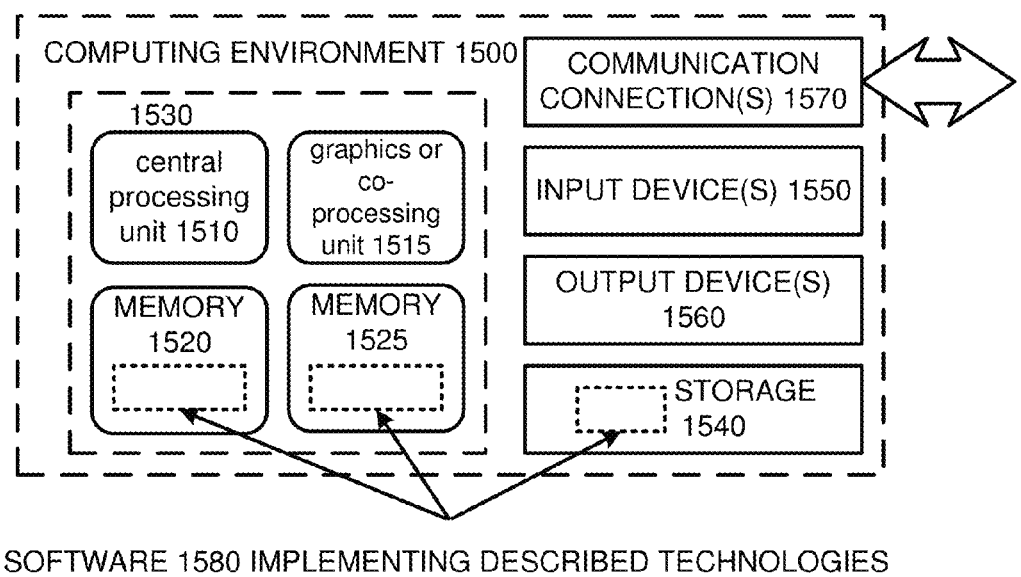
FIG. 15 is an example architecture that can be used in the embodiments herein.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, media player, gaming system, mobile device, etc.)

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s). The memory 1520, 1525 stores software 1580 implementing one or more innovations described herein, in the form of computer-executable instructions suitable for execution by the processing unit(s).

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing environment 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing environment 1500. For video encoding, the input device(s) 1550 may be a camera, video card, TV tuner card, or similar device that accepts video input in analog or digital form, or a CD-ROM or CD-RW that reads video samples into the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application Specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of increasing data bandwidth to a wireless client device, comprising:
   receiving a data message from the wireless client device;
   transmitting multiple parts of a response data message to the wireless client device across two types of wireless communication channels simultaneously by:
     transmitting a first part of the response data message to the wireless client device across a first wireless communication channel via a selected one or more transmitters of an array of two or more transmitters of a first transmitter type that in combination cover one or more areas of a room;
     simultaneously transmitting a second part of the response data message to the wireless client device across a second wireless communication channel via one or more transmitters of a second transmitter type, different than the first transmitter type; and
     encoding the first part of the response data message transmitted to the wireless client device over the selected one or more transmitters of the array of two or more transmitters of the first transmitter type, wherein the encoding is based on a location of the wireless client device in the room with respect to two or more transmitters in the array of transmitters of the first transmitter type.

2. The method of claim 1, further comprising:
   receiving an acknowledgment message from the wireless client device via the second wireless communication channel wherein the acknowledgement message includes acknowledging the first part of the data message received on the first wireless communication channel.

3. The method of claim 2, wherein:
   the first transmitter type is a free-space optical transmitter type, and
   the second transmitter type is a radio frequency transmitter type.

4. The method of claim 1, further comprising:
   receiving an identifier from the wireless client device that identifies a transmitter in the array of the two or more transmitters; and
   transmitting the first part of the data message to the wireless client device via the identified transmitter, without transmitting to the wireless client device via the other transmitters in the array of two or more transmitters.

5. The method of claim 4, further comprising:
   receiving a second identifier from the wireless client device that identifiers another transmitter in the array, indicating that the wireless client device moved location; and
   transmitting a third part of the data message to the wireless client device via the second identified transmitter, without transmitting to the wireless client device via the other transmitters in the array of two or more transmitters.

6. The method of claim 1, wherein:
   the encoding uses a channel matrix comprising:
     two or more columns, wherein each column represents a transmitter in the array of two or more transmitters of the first transmitter type,
     two or more rows, wherein each row represents a receiver configured to receive data messages over the first wireless communication channel, wherein the user device is one of the receivers, and
     M×N entries, wherein M is a number of the two or more rows, N is a number of the two or more columns, and each entry has a value that indicates whether a receiver associated with the entry's row is in range of a transmitter associated with the entry's column; and
   wherein the channel matrix is full-rank in a finite field, wherein the finite field has a number of elements that is equal to a number of signal levels at which the transmitters represented by the columns in the channel matrix can transmit.

7. The method of claim 1, further comprising:
   transmitting the first part of the data message at a first rate;
   transmitting the second part of the data message at a second rate, different than the first rate; and
   dynamically changing the first rate and the second rate based on the following:
     signal-to-noise ratios of the first wireless communication channel and the second wireless communication channel,
     a backlog associated with the first wireless communication channel and a backlog associated with the second wireless communication channel, and
     a location of the wireless client device relative to the transmitters in the array of two or more transmitters of the first transmitter type.

8. A system for transmitting data to wireless devices comprising:
   an array of two or more free-space optical (FSO) transmitters arranged to communicate with wireless devices in one or more areas of an enclosed space;
   a radio frequency (RF) receiver configured to communicate with the wireless devices in the one or more areas of the enclosed space;
   one or more radio frequency (RF) transmitters configured to communicate with the wireless devices in the one or more areas of the enclosed space; and an access point coupled to the array of FSO transmitters, the RF receiver, and the RF transmitters and configured to:
    receive a request from a wireless device of the wireless devices via the RF receiver,
    divide a response data message for the wireless device into portions,
    selectively transmit some of the portions of the response data message to the wireless device over at least one of the FSO transmitters and some other of the portions of the response data message to the wireless device over at least one of the RF transmitters, and
    encode the portions of the response data message transmitted over the at least one of the FSO transmitters, wherein the encoding is based on a location of the wireless device in the enclosed space with respect to two or more FSO transmitters in the array of FSO transmitters.

9. The system of claim 8, wherein the FSO transmitters are configured to transmit data via one or more cones of diffuse light.

10. The system of claim 9, wherein three or more of the FSO transmitters in the array of two or more transmitters are arranged in a triangular lattice.

11. The system of claim 9, wherein at least one of the FSO transmitters in the array of two or more transmitters comprises one or more light-emitting diodes.

12. The system of claim 9, wherein at least one of the FSO transmitters in the array of two or more transmitters comprises one or more vertical-cavity surface-emitting lasers.

13. The system of claim 8, further comprising:
an array of two or more FSO receivers coupled to the access point and arranged to receive signals from the wireless devices in in the one or more areas of the enclosed space.

14. The system of claim 8, further comprising:
a channel quality assessor configured to dynamically adjust a first data rate for the first wireless communication channel and a second data rate for the second wireless communication channel based on:
    a signal-to-noise ratio for the first wireless communication channel, and a signal-to-noise ratio for the second wireless communication channel, received from the wireless device;
    a size of a backlog of at least one queue associated with the first wireless communication channel, and a size of a backlog of at least one other queue associated with the second wireless communication channel; and
    a location of the wireless device relative to the transmitters in the array of two or more transmitters.

15. One or more computer-readable storage media storing computer-executable instructions for causing a wireless computing device to perform a method of increasing data bandwidth to the wireless computing device, the method comprising:
    transmitting to an access point, over a wireless radio frequency (RF) communication channel, a location of the wireless computing device in an enclosed space with respect to two or more free-space optical (FSO) transmitters configured to transmit data in the enclosed space via one or more cones of diffuse light;
    transmitting a request to the access point over the wireless RF communication channel; and
    receiving from the access point:
        a first part of a response over the wireless RF communication channel via an RF transmitter, and
        a second part of the response over a wireless diffuse light communication channel via one or more of the FSO transmitters, wherein the second part of the response is encoded by the access point based on the location of the wireless computing device in the enclosed space with respect to the two or more FSO transmitters.

16. The one or more computer-readable storage media of claim 15, wherein the method further comprises:
transmitting an acknowledgement message to the access point over the wireless RF communication channel after receiving the first and second parts of the response, acknowledging receipt of both the first and second parts of the response.

17. The one or more computer-readable storage media of claim 15, wherein the method further comprises:
receiving at least one beacon signal from one or more FSO transmitters, wherein each beacon signal comprises a transmitter identifier that uniquely identifies the FSO transmitter that sent the signal;
transmitting a location message to the access point comprising at least one of the transmitter identifiers received as part of the at least one beacon signal; and
receiving the second part of the response via one or more of the FSO transmitters from which the at least one beacon signal was received.

18. The one or more computer-readable storage media of claim 15, wherein the method further comprises:
decoding the second part of the response received via the one or more FSO transmitters, wherein the second part of the response comprises one or more bits, and the decoding comprises decoding each bit, of the one or more bits, by performing a modulo operation on each bit by a number of possible signal levels at which the one or more FSO transmitters can transmit.

19. A method of increasing data bandwidth to a wireless client device, comprising:
receiving a data message from the wireless client device;
receiving an identifier from the wireless client device that identifies a transmitter in an array of the two or more transmitters of a first type of a first transmitter type that in combination cover one or more areas of a room;
transmitting multiple parts of a response data message to the wireless client device across two types of wireless communication channels simultaneously by:
    transmitting a first part of the response data message to the wireless client device across a first wireless communication channel via the identified transmitter in the array of two or more transmitters, without transmitting to the wireless client device via the other transmitters in the array of two or more transmitters; and
    simultaneously transmitting a second part of the response data message to the wireless client device across a second wireless communication channel via one or more transmitters of a second transmitter type, different than the first transmitter type;
receiving a second identifier from the wireless client device that identifiers another transmitter in the array, indicating that the wireless client device moved location; and
transmitting a third part of the data message to the wireless client device via the second identified transmitter, without transmitting to the wireless client device via the other transmitters in the array of two or more transmitters.

20. A method of increasing data bandwidth to a wireless client device, comprising:
receiving a data message from the wireless client device;
transmitting multiple parts of a response data message to the wireless client device across two types of wireless communication channels simultaneously by:
encoding a first part of the data message, wherein the encoding is based on a location of the wireless client device with respect to two or more transmitters in an array of two or more transmitters of a first transmitter type that in combination cover one or more areas of a room, wherein the encoding uses a channel matrix comprising:
two or more columns, wherein each column represents a transmitter in the array of two or more transmitters of the first transmitter type,
two or more rows, wherein each row represents a receiver configured to receive data messages over the first wireless communication channel, wherein the user device is one of the receivers, and
M×N entries, wherein M is a number of the two or more rows, N is a number of the two or more columns, and each entry has a value that indicates whether a receiver associated with the entry's row is in range of a transmitter associated with the entry's column;
wherein the channel matrix is full-rank in a finite field, wherein the finite field has a number of elements that is equal to a number of signal levels at which the transmitters represented by the columns in the channel matrix can transmit;
transmitting the encoded first part of the response data message to the wireless client device across a first wireless communication channel via a selected one or more transmitters of the array of two or more transmitters of the first transmitter type; and
simultaneously transmitting a second part of the response data message to the wireless client device across a second wireless communication channel via one or more transmitters of a second transmitter type, different than the first transmitter type.

21. A method of increasing data bandwidth to a wireless client device, comprising:
receiving a data message from the wireless client device;
transmitting multiple parts of a response data message to the wireless client device across two types of wireless communication channels simultaneously by:
transmitting a first part of the response data message at a first rate to the wireless client device across a first wireless communication channel via a selected one or more transmitters of an array of two or more transmitters of a first transmitter type that in combination cover one or more areas of a room;
simultaneously transmitting a second part of the response data message at a second rate, different than the first rate, to the wireless client device across a second wireless communication channel via one or more transmitters of a second transmitter type, different than the first transmitter type; and
dynamically changing the first rate and the second rate based on the following:
signal-to-noise ratios of the first wireless communication channel and the second wireless communication channel,
a backlog associated with the first wireless communication channel and a backlog associated with the second wireless communication channel, and
a location of the wireless client device relative to the transmitters in the array of two or more transmitters of the first transmitter type.

22. A system for transmitting data to wireless devices comprising:
an array of two or more free-space optical (FSO) transmitters arranged to communicate with wireless devices in one or more areas of an enclosed space via a first wireless communication channel;
a radio frequency (RF) receiver configured to communicate with the wireless devices in the one or more areas of the enclosed space via a second wireless communication channel;
one or more radio frequency (RF) transmitters configured to communicate with the wireless devices in the one or more areas of the enclosed space via the second wireless communication channel;
an access point coupled to the array of FSO transmitters, the RF receiver, and the RF transmitters and configured to:
receive a request from a wireless device of the wireless devices via the RF receiver,
divide a response data message for the wireless device into portions, and
selectively transmit some of the portions of the response data message to the wireless device over at least one of the FSO transmitters and some other of the portions of the response data message to the wireless device over at least one of the RF transmitters; and
a channel quality assessor configured to dynamically adjust a first data rate for the first wireless communication channel and a second data rate for the second wireless communication channel based on:
a signal-to-noise ratio for the first wireless communication channel, and a signal-to-noise ratio for the second wireless communication channel, received from the wireless device;
a size of a backlog of at least one queue associated with the first wireless communication channel, and a size of a backlog of at least one other queue associated with the second wireless communication channel; and
a location of the wireless device relative to the FSO transmitters in the array of two or more FSO transmitters.

* * * * *